US009221568B2

(12) United States Patent  (10) Patent No.: US 9,221,568 B2
Nakamoto  (45) Date of Patent:  Dec. 29, 2015

(54) BAG TRANSFER DEVICE

(71) Applicant: Toyo Jidoki Co., Ltd., Minato-ku, Tokyo (JP)

(72) Inventor: Kakue Nakamoto, Iwakuni (JP)

(73) Assignee: TOYO JIDOKI CO., LTD., Tokyo (JP)

( * ) Notice: Subject to any disclaimer, the term of this patent is extended or adjusted under 35 U.S.C. 154(b) by 0 days.

(21) Appl. No.: 14/614,170

(22) Filed: Feb. 4, 2015

(65) Prior Publication Data

US 2015/0217888 A1  Aug. 6, 2015

(30) Foreign Application Priority Data

Feb. 4, 2014  (JP) ................................. 2014-019869
Oct. 27, 2014  (JP) ................................. 2014-218743

(51) Int. Cl.
| | | |
|---|---|---|
| *B65G 47/84* | (2006.01) | |
| *B65B 43/46* | (2006.01) | |
| *B65G 29/00* | (2006.01) | |
| *B65G 47/86* | (2006.01) | |
| *B65B 43/50* | (2006.01) | |
| *B65B 59/02* | (2006.01) | |

(52) U.S. Cl.
CPC .............. *B65B 43/465* (2013.01); *B65B 43/50* (2013.01); *B65B 59/02* (2013.01); *B65G 29/00* (2013.01); *B65G 47/847* (2013.01)

(58) Field of Classification Search
CPC .... B65G 29/00; B65G 47/847; B65G 47/846; B65G 17/323; B65G 17/42; B65G 47/84
USPC ....................... 198/470.1, 474.1, 476.1, 478.1
See application file for complete search history.

(56) References Cited

U.S. PATENT DOCUMENTS

| | | | | |
|---|---|---|---|---|
| 4,172,514 A | * | 10/1979 | Shantz ................. | B65G 47/842 198/470.1 |
| 4,892,185 A | * | 1/1990 | Guardiola ............ | G01G 19/393 198/477.1 |
| 5,360,101 A | * | 11/1994 | Carlen ..................... | B65H 5/14 198/470.1 |
| 6,302,172 B1 | * | 10/2001 | De Villele ............... | B67C 3/242 198/470.1 |
| 8,006,825 B2 | * | 8/2011 | Lenherr ................. | B65G 29/00 198/474.1 |
| 2008/0210520 A1 | * | 9/2008 | Legallais ............. | B65G 47/847 198/470.1 |

FOREIGN PATENT DOCUMENTS

| | | |
|---|---|---|
| JP | 5-28169 | 7/1993 |
| JP | 2004-244085 | 7/1993 |
| JP | 9-95318 | 4/1997 |
| JP | 11-189201 | 7/1999 |
| JP | 3261543 | 3/2002 |
| JP | 2002-302227 | 10/2002 |
| JP | 2007-210646 | 8/2007 |
| JP | 2009-220853 | 10/2009 |

* cited by examiner

*Primary Examiner* — James R Bidwell
(74) *Attorney, Agent, or Firm* — DLA Piper LLP (US)

(57) ABSTRACT

A rotary-type bag transfer device including a plurality of pairs of left and right grippers (2) provided around an intermittently rotating table (1). A first support shaft (8) and a second support shaft (9) are provided on the base portion of each of the arms (5) of the grippers. A first link (14) linked at its one end to the table and pivotable horizontally is linked at another end thereof to the center of a second link (15), the second link is linked at one end thereof to the first support shaft, and a sliding member (21) installed at the other end of the second link is provided to slide in a slot (22) formed in the table. The slot is parallel to a reference plane (N). A restricting link (24) linked at one end to the table is linked at another end to the second support shaft.

20 Claims, 15 Drawing Sheets

BAG TRANSFER DEVICE

BACKGROUND OF THE INVENTION

1. Field of the Invention

The present invention relates to a bag transfer device used in bag filling and packaging apparatuses and the like and more particularly to a bag transfer device that includes a plurality of pairs of left and right grippers installed on a table rotating horizontally and a spacing adjustment mechanism provided for adjusting the spacing between the left and right grippers.

2. Description of the Related Art

Japanese Utility Model Application Publication No. H5-28169 discloses a bag transfer device that is installed in a bag filling and packaging apparatuses. This bag transfer device comprises an intermittently rotating table and a plurality of pairs of left and right grippers disposed at a constant angular spacing around the table. The left and right grippers are moved intermittently around a circular movement path when the table rotates. Each gripper has an arm and a clamping component installed at the distal end of the arm. The arms of the left and right grippers are axially supported respectively at their base portions by the table, and they are able to pivot in linear symmetry to each other within a horizontal plane.

The above-described bag transfer device includes, as a spacing adjustment mechanism for adjusting the spacing between the left and right grippers, a cylindrical cam, which is installed under the table so as to be able to move up and down, and an L-shaped lever, and it further includes a star cam and a latching pin. The center axis of the cylindrical cam coincides with the rotational axis of the table, and its upper end makes is a cam face. The L-shaped lever is axially supported by the table and is able to pivot in a vertical plane, and it has at one end thereof a cam follower that rotates over the cam face of the cylindrical cam and also has at another end thereof a press roller that comes into contact with the tail end of the arm so as to cause the arm to pivot. The star cam is rotated coaxially with the table. Also, the star cam can be rotated relative to the table and further can be positioned at a position after it has been rotated by a suitable angle. The latching pin is fixed to the arm.

In the above-described bag transfer device, while the table intermittently is rotating, the cam follower rotates over the cam face and moves up and down according to the shape (protrusion) of the cam face, which is accompanied by the opening and closing motions of the arms of the left and right grippers, so that the spacing between the left and right grippers (and especially the spacing between the clamping components) increases or decreases within a specific range. When the spacing between the left and right grippers decreases to a specific value, the latching pin comes into contact with the star cam. The maximum spacing of the left and right grippers is determined by the maximum height of the cam face of the cylindrical cam, and the minimum spacing of the left and right grippers is restricted by the star cam.

When the bag size (and particularly the bag width) is changed (or bags of different sizes are processed by bag transfer device), the maximum and minimum spacing of the left and right grippers has to be adjusted to match the width of the changed (or different) bag. This can be done by raising or lowering the cylindrical cam and rotating the star cam relative to the table.

Japanese Patent Application Laid-Open (Kokai) No. H9-95318 is similar to Japanese Utility Model Application Publication No. H5-28169, and it discloses also a bag transfer device. This bag transfer device includes an intermittently rotating table and a plurality of pairs of left and right grippers disposed at a constant angular spacing around the table. In this bag transfer device, instead of the cylindrical cam and star cam of Japanese Utility Model Application Publication No. H5-28169, a bag width setting cam and an offset width adjustment cam are employed as a spacing adjustment mechanism for adjusting the spacing of the left and right grippers. The offset width is the distance that the clamping components of the grippers are moved, during the process of the table making its intermittent rotation, between the widest and narrowest spacing of the left and right grippers, and it is equal to one-half the difference between the maximum and minimum values for the spacing of the left and right grippers.

Furthermore, in the bag transfer devices disclosed in Japanese Patent Application Laid-Open (Kokai) Nos. H11-189201 and 2007-210646, parallel links are employed as a spacing adjustment mechanism so as to adjust the spacing of the left and right grippers.

In the above-described bag transfer devices of Japanese Utility Model Application Publication No. H5-28169 and Japanese Patent Application Laid-Open (Kokai) No. H9-95318, when a change in bag size (bag width) dictates the adjustment of the spacing of the left and right grippers, the arms are pivoted around their base portions within a horizontal plane. Accordingly, other than the bags of a certain size (width), the clamping faces of the clamping components of the grippers can be tilted with respect to the width direction of the bags, and the gripper spacing becomes narrow to cause deformation of the opening shape when the bag mouth is opened, which may prevent the bags from being filled stably. Meanwhile, when the gripper spacing is increased and the bag mouth is closed, the edges of the bag (the places where the bag is clamped by the clamping components of the grippers) can become tilted, and this would prevent the stable sealing of the bags as well. Also, if the arms are pivoted in a horizontal plane, the clamping faces of the clamping components of the grippers deviate in the bag thickness direction (the radial direction of the table). Accordingly, the transfer path of the bags may vary depending on the bag size (bag width) (in other words, the transfer path of the bags may deviate in the thickness direction of the bags), which may prevent stable processing in, for instance, the opening step, the filling step, and sealing step for the bag.

In the above-described bag transfer devices of Japanese Patent Application Laid-Open (Kokai) Nos. H11-189201 and 2007-210646, the spacing of the left and right grippers can be adjusted by varying the inclination of parallel links that support the clamping components of the grippers, and at that time no tilting of the clamping faces of the clamping components would occur with respect to the width direction of the bags. However, due to the properties of the parallel link, when the spacing of the left and right grippers is changed, the clamping faces of the clamping components deviate in the thickness direction of the bags (in other words, the transfer path of the bags deviates in the thickness direction of the bags), and this movement cannot be restricted.

Also, the above-described problems in tilting of the clamping faces of the clamping components of the grippers with respect to the width direction of the bags or in a change in the transfer path due to deviation of the clamping faces of the clamping components of the grippers in the thickness direction of the bags can likewise occur when the spacing of the left and right grippers is increased or decreased while the grippers are being moved along the movement path.

BRIEF SUMMARY OF THE INVENTION

It is, accordingly, an object of the present invention to provide a bag transfer device which is used in bag filling and packaging apparatuses and in which tilting of the clamping faces of the clamping components of the grippers, or deviation of the bag transfer path in the thickness direction of the bag, is essentially prevented from occurring when the spacing of a pair of (or two) grippers is adjusted in view of changes in bag size (bag width) or when the spacing of left and right grippers is increased or decreased while the grippers are being moved along the movement path.

The above object is accomplished by a unique structure of the present invention for a bag transfer device,
which includes:
- a conveying member that rotates in a horizontal plane,
- a plurality of pairs of left and right grippers that are disposed on the conveying member and moved along an annular movement path as the conveying member rotates, and
- a spacing adjustment mechanism that increases or decreases the spacing within the horizontal plane of the left and right grippers while the plurality of pairs of left and right grippers are being moved along the movement path; and in which
- each gripper is comprised of an arm and a clamping component installed at the distal end of the arm,
- the clamping components of the left and right grippers clamp the left and right sides of a bag, and
- the bag is transferred along an annular transfer path;

wherein
the spacing adjustment mechanism comprises:
- an arm support mechanism disposed at each arm of the left and right grippers, and
- a drive force transmission mechanism that operates the arm support mechanism; and first and second support components are set at the base portion of each arm and separated by a specific distance in the horizontal direction; and the arm support mechanism comprises:
- a first link that is linked at one end thereof to the conveying member and is pivotable within a horizontal plane,
- a second link that is linked at one end thereof to the first support component and is linked at the middle portion to the other end of the first link,
- a first restricting mechanism that restricts the movement direction of the other end of the second link such that the movement direction is perpendicular to the width direction of a bag clamped by the clamping components of the left and right grippers, and
- a second restricting mechanism that is linked to the second support component and restricts the movement direction of the second support component such that the movement direction is parallel to the width direction of the bag clamped by the clamping components of the left and right grippers;

the first link, the second link, and the first restricting mechanism constitutes a Scott-Russell mechanism; and
the drive force transmission mechanism transmits drive force to the second link so as to operate the Scott-Russell mechanism.

The terms "parallel" and "perpendicular" used in the present invention encompass not only parallel and perpendicular relations in the strict sense but also a substantially parallel relation and a substantially perpendicular relation. Also, the ordinal expressions such as "first," "second," and so on used in the present invention are only given for the purpose of differentiation.

In the above-described bag transfer device of the present invention, the conveying member is, for example, a single table that intermittently rotates by a constant angle around a vertical axis; and in such a case of rotating table, a plurality of pairs of left and right grippers are disposed around the table, and the movement path of the grippers is in a circular shape. However, the conveying member can be composed of a plurality of members, and it can rotate continuously. For instance, as disclosed in Japanese Patent Application Laid-Open (Kokai) No. 2002-302227, an endless chain composed of a plurality of component members can be provided so as to rotate at a constant speed around an annular path, and such an endless chain is encompassed by the conveying member referred to in the present invention.

If a table that is intermittently rotates by a constant angle around a vertical axis is employed as the conveying member, then it is preferable to employ a cam drive system just as disclosed in the bag transfer device of Japanese Utility Model Application Publication No. H5-28169, in order to adjust the gripper spacing. In this case, a cylindrical cam whose center coincides with the above-described vertical axis is installed so as to be able to move up and down at a position under the table.

The drive force transmission mechanism of the spacing adjustment mechanism is comprised of, for example,
- a pivot lever that is linked at an intermediate position thereof to the conveying member (table) and is pivotable within a horizontal plane,
- a cam lever that is disposed between the cylindrical cam and the pivot lever, that is axially supported at its intermediate position by the table, that has at its one end a cam follower for rotating over the cam face of the cylindrical cam, and whose other end comes into contact with one end of the pivot lever,
- a third link that is provided more to the outer peripheral side of the table than the pivot lever and is linked at its one end to the table and pivotable within a horizontal plane,
- a fourth link that extends in the radial direction of the table between the pivot lever and the third link, is linked at its one end to the other end of the pivot lever, and is linked at the other end to the other end of the third link,
- a pair of fifth links with each of which linked at its one end to the second link of each arm support mechanism,
- a pair of sixth links with each of which linked at its one end to an intermediate position of the fourth link and is linked at its other end to the other end of the fifth link, and
- a pair of seventh links that is linked at its one end to the table and are linked at the other end to the other end of the fifth link.

The cam follower of the cam lever is rotated over the cam face of the cylindrical cam, and drive force caused thereby is transmitted through the drive force transmission mechanism to the second link of each of the arm support mechanisms.

In this bag transfer device, if needed, a gripper position adjustment ring can be provided on the conveying member (table). The gripper position adjustment ring coincides at its center with the vertical axis of the conveying member (table), rotates intermittently together with the table, and is able to rotate relative to the table. In this structure, the seventh links are linked at its one end to the gripper position adjustment ring.

In the above-described bag transfer device, the first restricting mechanism is comprised of, for example, a first sliding member, which is installed at the other end of the second link, and a first restricting member, which is provided to the conveying member and has therein a first slot into which the first sliding member is fitted. The first sliding member is provided slidable in the lengthwise direction of the first slot. The first slot can be formed in the conveying member (in this case part of the conveying member will correspond to the first restricting member), or the first slot can be formed in some other member than the conveying member with this other member installed on the conveying member (in this case the other member will correspond to the first restricting member). The length direction of the first slot is perpendicular to the width direction of the bags clamped by the clamping components of the left and right grippers.

In the bag transfer device described above, the second restricting mechanism is comprised of, for example, a restricting link that is linked at its one end to the conveying member and is linked at its other end to the second support component. The restricting link is provided pivotable in a horizontal plane using the linked part of the one end as its axis, and it extends perpendicular to the width direction (parallel to the length direction of the first slot) of a bag that is clamped by the clamping components of the left and right grippers.

Further, the second restricting mechanism can be comprised of, for example, a second sliding member, which is installed on the second support component, and a second restricting member, which is provided on the conveying member and has formed therein with a second slot into which the second sliding member is fitted. The second sliding member is provided slidable in the lengthwise direction of the second slot. The second slot can be formed in the conveying member (in this case part of the conveying member will correspond to the second restricting member), or it can be formed in a member other than the conveying member with this other member installed on the conveying member (in this case the other member will correspond to the second restricting member). The length direction of the second slot is parallel to the width direction (perpendicular to the length direction of the first slot) of a bag clamped by the clamping components of the left and right grippers.

The above-described bag transfer device can also be applied to a so-called double bag transfer device (see Japanese Patent Application Laid-Open (Kokai) No. 2004-244085, for example). In such a double bag transfer device,

- an even number of pairs of left and right grippers are provided,
- the clamping surface of the clamping components of two adjacent pairs of left and right grippers lie in substantially the same horizontal plane, and
- the spacing between the left and right grippers, which are of one pair of grippers of two adjacent pairs of grippers, and the spacing between the left and right grippers, which are of another pair of grippers of the two adjacent pairs of grippers, are increased or decreased in a horizontal plane at the same time.

In this configuration,

- the grippers of two adjacent pairs of left and right grippers have (share) a common drive force transmission mechanism,
- a first connecting link is provided to connect:
    - the arm support mechanism of the gripper, which is of one pair of grippers of adjacent two pairs of grippers and on a downstream side of the movement path, to
    - the arm support mechanism of the gripper, which is of another one pair of grippers of adjacent two pairs of grippers and on a downstream side of the movement path;
- a second connecting link is provided to connect:
    - the arm support mechanism of the gripper, which is of one pair of grippers of adjacent two pairs of grippers and on an upstream side of the movement path, to
    - the arm support mechanism of the gripper, which is of another one pair of grippers of adjacent two pairs of grippers and on an upstream side of the movement path, and
- two adjacent pairs of left and right grippers are moved in the same manner.

According to the present invention as described above, tilting of the clamping faces of the clamping components of the grippers, or a change in the bag transfer path, can be substantially prevented when the left and right gripper spacing is adjusted due to the change in bag size (bag width). Also, tilting of the clamping faces of the clamping components of the grippers, or deviation of the bag transfer path in the thickness direction of the bags, can be substantially prevented even when the left and right gripper spacing is increased or decreased while the grippers are being moved along the movement path.

DETAILED DESCRIPTION OF THE INVENTION

A bag transfer device according to the present invention will be described below in specific terms with reference to FIGS. 1 to 15.

Figure 1:
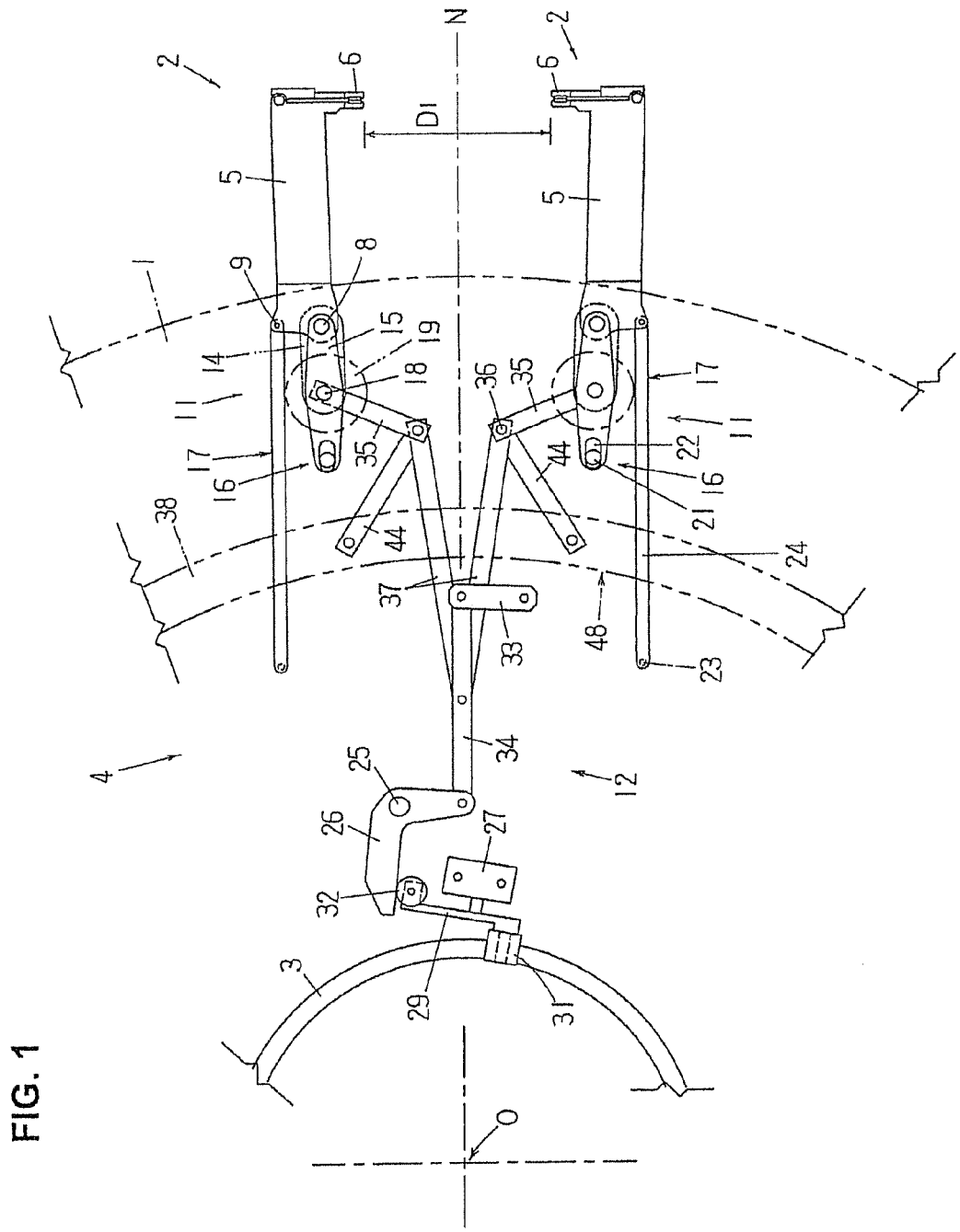
FIG. 1 is a partial top view of a bag transfer device according to the present invention, in which members disposed under the table are illustrated by solid lines.
Figure 2:
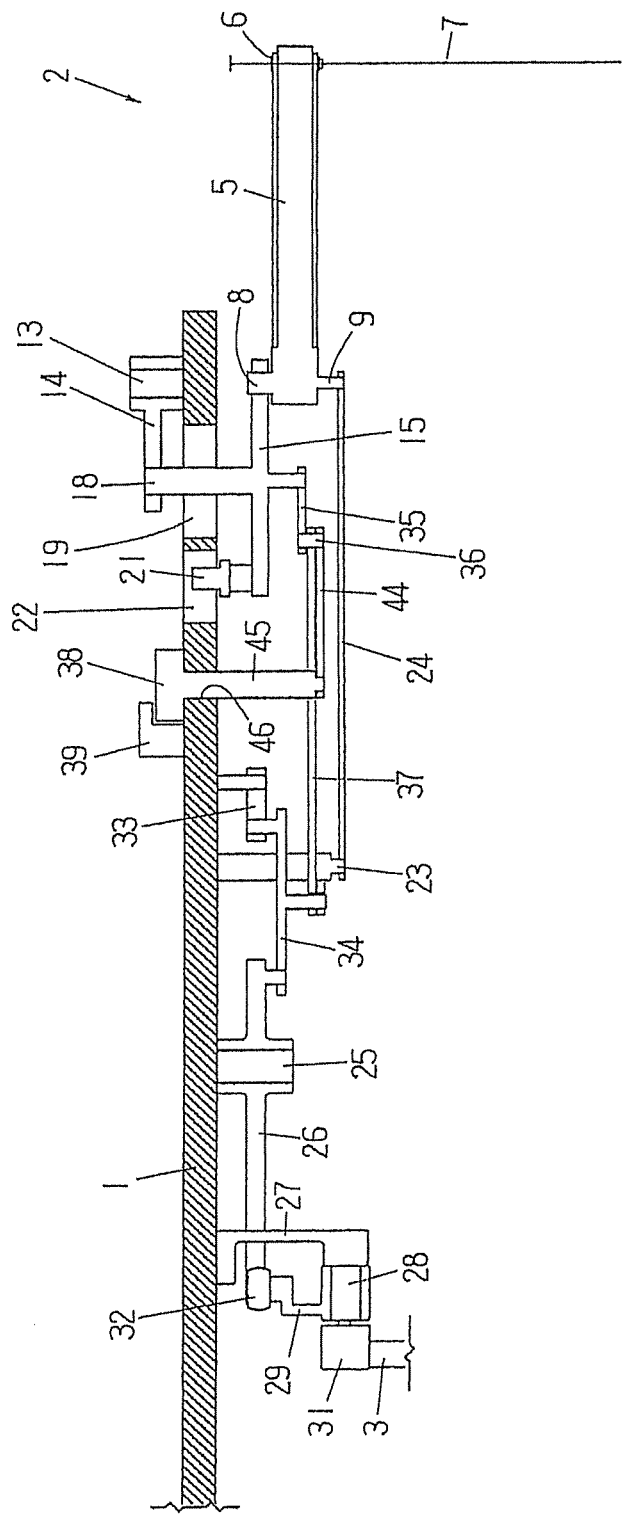
FIG. 2 is a partially cross-sectional partial side view of the bag transfer device shown in FIG. 1.
Figure 3:
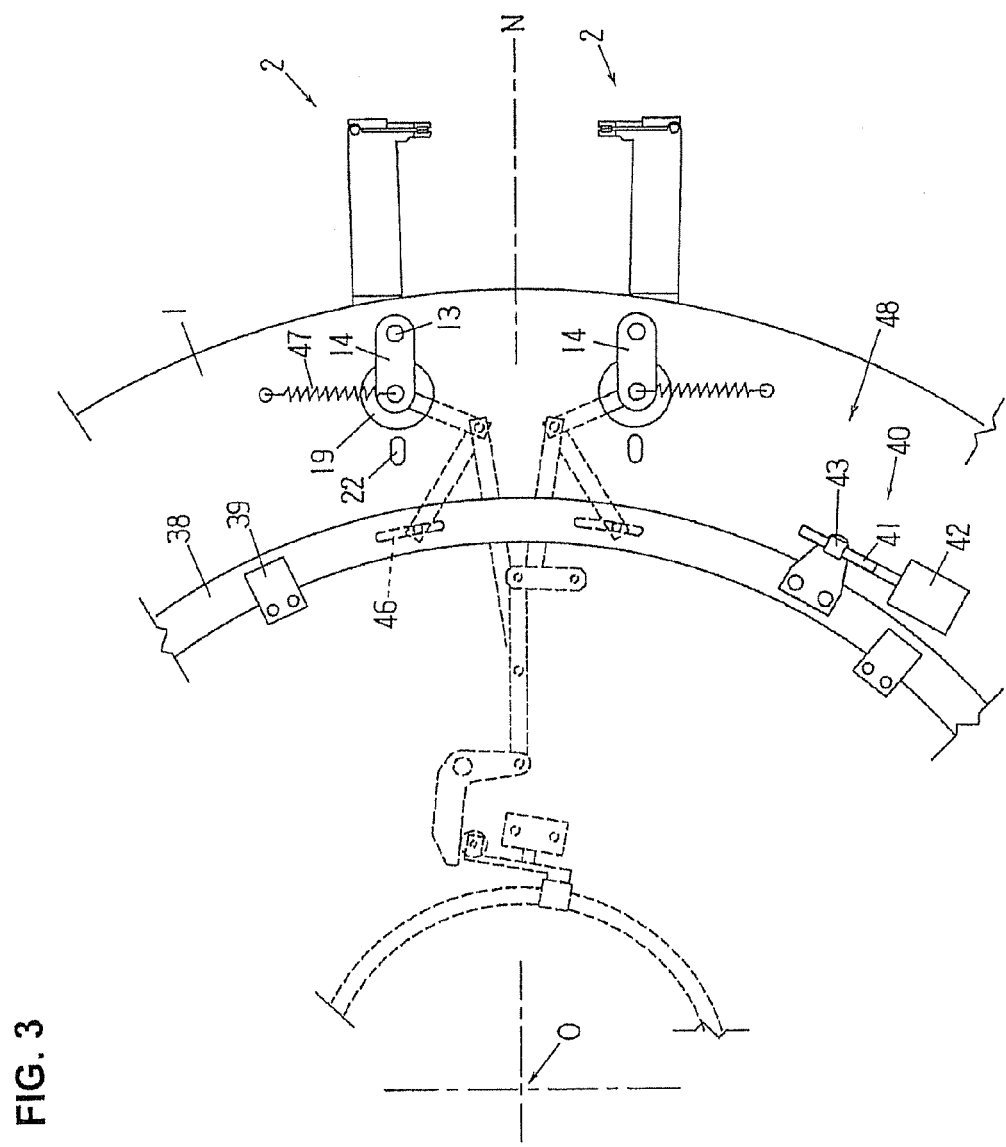
FIG. 3 is a partial top view of the bag transfer device shown in FIGS. 1 and 2, in which members disposed above the table are mainly illustrated.

FIGS. 1 to 3 show a bag transfer device applied to, for example, a rotary-type bag filling and packaging apparatus (see Japanese Utility Model Application Publication No. H5-28169).

This bag transfer device of the present invention is similar to the bag transfer device disclosed in Japanese Utility Model Application Publication No. H5-28169, and it comprises: a table 1 that rotates intermittently at a constant angle within a horizontal plane; a plurality of pairs of left and right grippers 2 that are disposed at a constant-angle spacing around the table 1 (the angle is the same as the angle at which the table 1 rotates each time) and moved along a circular movement path; a cylindrical cam 3 that is provided at a position under the table with its center coinciding with the axis O of the table 1, is able to move up and down, and has on its upper end a cam face; and a spacing adjustment mechanism 4 that increases or decreases the spacing of the left and right grippers 2 while the left and right grippers 2 are being moved along the movement path. The cylindrical cam 3 rotates by the same angle and in synchronization with the intermittent rotation of the table 1, and it rotates back by the same angle and returns to its original position when the table 1 stops its rotation.

This bag transfer device further includes a drive source for intermittently driving the table 1, a drive source for raising and lowering the cylindrical cam 3, and a drive source for rotating the cylindrical cam 3 forward and backward. These drive sources are not illustrated in the drawings.

In the above structure, the cam face of the cylindrical cam 3 is formed to face upward at the upper end. However, the cam surface can instead be formed so as to face downward at the lower end of the cylindrical cam 3 (in this case the direction in which the force of a biasing member (discussed below) is exerted is reversed). Also, no drive source can be installed for raising and lowering the cylindrical cam 3, and the raising and lowering can be accomplished manually using a handle.

In FIGS. 1 to 3, the left and right grippers 2 are each composed of an arm 5 and a clamping component 6 provided at the distal end of the arm 5. The left and right edges of a bag 7 (see FIG. 2) are clamped by these clamping components 6, and as the left and right grippers 2 are moved along the movement path, the bag 7 is transferred along the circular transfer path. If the bag 7 is, for example, a flat bag disclosed in Japanese Utility Model Application Publication No. H5-28169, which is rectangular in top view (sealed on three sides and open above), the left and right grippers 2 are disposed in symmetry with respect to a vertical plane N that is perpendicular to a tangent to the movement path or the transfer path (see FIG. 1, the vertical plane passing through the axis O of the table 1), and the spacing between the grippers 2 is increased or decreased symmetrically with respect to the vertical plane N as the bag is being transferred along the transfer path. This layout (location) of the left and right grippers 2 in FIG. 1 is called a "reference layout" in the present invention, and the vertical plane N is called a "reference plane" (hereinafter referred to as the reference plane N). It should go without saying that the reference plane N is a plane set on the table 1 and is intermittently rotated around the axis O of the table 1 together with the intermittent rotation of the table 1. Also, the pairs of left and right grippers 2 provided on the table 1 are all shown in this reference layout.

At the base portion of each arm 5, a first support component (first support shaft 8) and a second support component (second support shaft 9) are provided. An imaginary vertical plane passing through the centers of these first and second support shafts 8 and 9 is parallel to the clamping faces of the clamping components 6 (parallel to the width direction of the bag 7 clamped by the clamping components 6), and the first support shaft 8 and the second support shaft 9 are separated by a specific distance in the horizontal direction within this vertical plane.

The spacing adjustment mechanism 4 comprises arm support mechanisms 11 disposed for each arm 5 and a drive force transmission mechanism 12 that operates the arm support mechanisms 11. The drive force transmission mechanism 12 is provided for each pair of grippers 2.

The arm support mechanism 11 of the spacing adjustment mechanism 4 is formed for each one of the arms 5 by: a first link 14 that is linked at one end thereof to a shaft 13 protruding on the table 1 (see FIG. 2) and is pivotable in a horizontal plane, a second link 15 that is linked at one end thereof to the first support shaft 8 and is linked at its center to the other end of the first link 14, a first restricting mechanism 16 that restricts the movement direction of the other end of the second link 15, and a second restricting mechanism 17 that restricts the movement direction of the second support shaft 9. The first links 14 of the arms 5 are disposed over the table 1, while the second links 15 of the arms 5 are disposed under the table 1. The other ends of the first links 14 and the centers of the second links 15 are linked respectively via vertical shafts 18, and the shafts 18 are respectively disposed in holes 19 formed in the table 1.

The first restricting mechanisms 16 of the arm support mechanisms 11 restrict the movement direction of the other ends of the second links 15 so that the other ends are moved parallel to the reference plane N (substantially perpendicular to the width direction of the bag 7 clamped by the clamping components 6). Each of the first restricting mechanisms 16 comprises a first sliding member 21 installed at the other end of the second link 15 and a first restricting member formed with a first slot 22 into which the first sliding member 21 is fitted. In the shown structure, the first slot 22 is formed in the table 1, and part of the table 1 (and particularly the region around the first slot 22) makes the first restricting member. The first slot 22 is formed parallel to the reference plane N, and the first sliding member 21 is fitted in the first slot 22 so as to be slidable along (or in) the first slot 22. It is also possible to form the first slot 22 in a member other than the table 1 and fix this other member to the table 1 (see the second restricting member 69 described below), in which case this other member makes the first restricting member.

The first link 14, the second link 15, and the first restricting mechanism 16 constitute a Scott-Russell mechanism; and when the other end (the first sliding member 21) of the second link 15 is moved parallel to the reference plane N, the one end (the first support shaft 8) of the second link 15 is moved perpendicular to the reference plane N.

The second restricting mechanism 17 of each one of the arm support mechanisms 11 restricts the second support shaft 9 so that its movement direction of the second support shaft 9 is substantially perpendicular to the reference plane N, and it comprises a restricting link 24, which is linked at one end thereof, on the side nearest the center of the table 1, to the table 1 via a shaft 23 in a pivotable fashion within a horizontal plane. The restricting link 24 extends substantially parallel to the reference plane N and is linked at its other end to the second support shaft 9. The movement path of the second support shaft 9 is arc-shaped, and its movement direction is not perpendicular in a strict sense to the reference plane N; however, if the length of the restricting link 24 is set longer, the movement path will be an arc of a larger diameter (thus approximating a straight line), and the movement direction can be brought closer to being perpendicular (substantially perpendicular) to the reference plane N.

The drive force transmission mechanism 12 of the spacing adjustment mechanism 4 comprises a pivot lever 26 and a cam lever 29. The pivot lever 26 is rotatably linked at an intermediate position thereof to a shaft 25 fixed to the table 1 and is pivotable in a horizontal plane. The cam lever 29 (see the L-shaped lever 14 in Japanese Utility Model Application Publication No. H5-28169) is disposed between the cylindrical cam 3 and the pivot lever 26, and it is rotatably linked at an intermediate position thereof to the shaft 28 of a bracket 27 fixed to the table 1 and is pivotable in a vertical plane. The cam lever 29 has at one end thereof a cam follower 31 that rotates over the cam face of the cylindrical cam 3 as the table 1 rotates, and it has at the other end a roller 32 that comes into contact with one end of the pivot lever 26.

The drive force transmission mechanism 12 further comprises a third link 33, a fourth link 34, a pair of fifth links 35 and a pair of sixth links 37. The third link 33 is provided more to the outer peripheral side of the table 1 than the pivot lever 26, and it is linked at one end thereof to the table 1 and is pivotable in a horizontal plane. The fourth link 34 extends along the reference plane N between the pivot lever 26 and the third link 33, and it is linked at one end thereof to the other end of the pivot lever 26 and at another end thereof to the other end of the third link 33. Each one of the fifth links 35 is linked at one end thereof to the intermediate position of the second link 15 of the arm support mechanisms 11. Each one of the sixth links 37 is linked at one end thereof to the intermediate position of the fourth link 34 and at another end thereof to the other end (the shaft 36) of the fifth link 35.

The length from the shaft 25 to the other end (the point linked to the fourth link 34) of the pivot lever 26 is set to be the same as the length from one end (the point linked to the table 1) to another end (the point linked to the fourth link 34) of the third link 33.

As is shown clearly in FIG. 3, a gripper position adjustment ring 38 that rotates intermittently together with the table 1 and whose center coincides with the axis O of the table 1 is installed on the table 1. The gripper position adjustment ring 38 is guided by a plurality of guide members 39 disposed on the table 1 and is rotated relatively with respect to the table 1. A drive mechanism 40 that rotates the gripper position adjustment ring 38 is installed on the table 1. The drive mechanism 40 comprises a motor 42, whose output shaft is a threaded shaft 41, and a nut member 43, which is installed on the gripper position adjustment ring 38. The threaded shaft 41 meshes with the nut member 43; and thus when the threaded shaft 41 is rotated, the nut member 43 is moved, and thus the gripper position adjustment ring 38 is rotated while sliding over the table 1.

As part of the drive force transmission mechanism 12, a pair of seventh links 44 are provided. Each of the seventh links 44 is linked at one end thereof to the gripper position adjustment ring 38 and is linked at another end thereof to the other end of each of the fifth links 35 (which is also the other end of each of the sixth links 37) by the shaft 36. As seen from FIG. 2, the gripper position adjustment ring 38 and the seventh link 44 are lined by a shaft 45 that pass (penetrates) through the table 1 above and below (or vertically). Arc-shaped slots 46 into which the shafts 45 are fitted respectively are formed in the table 1 as seen from FIG. 3. When the gripper position adjustment ring 38 is rotated around the axis O, the shafts 45 slide in the slots 46 and rotate around the axis O.

Furthermore, as part of the drive force transmission mechanism 12, biasing members (tension spring 47) are provided on the table 1. Each of the tension springs 47 is connected at one end thereof to the table 1 and at another end thereof to the first link 14, and it presses the cam follower 31 of the cam lever 29 against the cam face of the cylindrical cam 3.

The pair of seventh links 44 of the drive force transmission mechanism 12 constitute a gripper position adjustment mechanism 48 together with the gripper position adjustment ring 38, the drive mechanism 40, etc. (the action will be described below). The bag transfer device need not have the gripper position adjustment mechanism 48; and if it does not, then one end of the each one of the seventh links 44 is directly linked to the table 1.

When the layout of the left and right grippers 2 is the reference layout (the layout state shown in FIGS. 1 and 3), the fifth links 35, the sixth links 37, and the seventh links 44 are disposed in symmetry with respect to the reference plane N.

In FIG. 1, the spacing between the grippers 2 (the spacing between the clamping components 6 of the grippers) is D1. The clamping faces of the clamping components 6 of the grippers 2 lie in a vertical plane that is perpendicular to the reference plane N. The width direction of a bag 7 clamped by the left and right clamping components 6 is perpendicular to the reference plane N.

In the above described structure of the bag transfer device of the present invention, when the cylindrical cam 3 ascends and descends, the cam follower 31 of the cam lever 29 also ascends and descends, the cam lever 29 thus pivots in a vertical plane, the pivot lever 26 pivots in a horizontal plane, the fourth link 34 is moved substantially along the reference plane N, and drive force caused thereby is transmitted to the left and right second links 15, which are part of the Scott-Russell mechanism (consisting of the first links 14, the second links 15, and the fifth links 35), via the sixth links 37 and the fifth links 35. The shafts 36, which are the connecting points of the fifth links 35, the sixth links 37, and the seventh links 44, are restrained by the seventh links 44 so as to make arc-shape movements. Also, the various pairs of the second links 15, the fifth links 35, and the sixth links 37 are moved symmetrically with the reference plane N in between them.

The other ends (the first sliding members 21) of the second links 15 are restricted by the first restricting mechanisms 16 so that their movement direction is parallel to the reference plane N. Accordingly, one end (the first support shaft 8 of the arm 5) of each one of the second links 15 is moved perpendicular to the reference plane N. This movement direction can also be considered to be the tangential direction of the transfer path of the bag 7 clamped by the clamping components 6.

As the first support shafts 8 of the arms 5 are moved, the second support shafts 9 of the arms 5 are also moved. As described above, the movement direction of the second support shafts 9 at this point is substantially perpendicular to the reference plane N.

The first support shafts 8 and the second support shafts 9 that support the base portions of the arms 5 are moved perpendicular and substantially perpendicular to the reference plane N, and consequently the arms 5 are moved substantially perpendicular to the reference plane N, which is accompanied by a change in the spacing between the two grippers 2 (the spacing between the clamping components 6).

Figure 4:
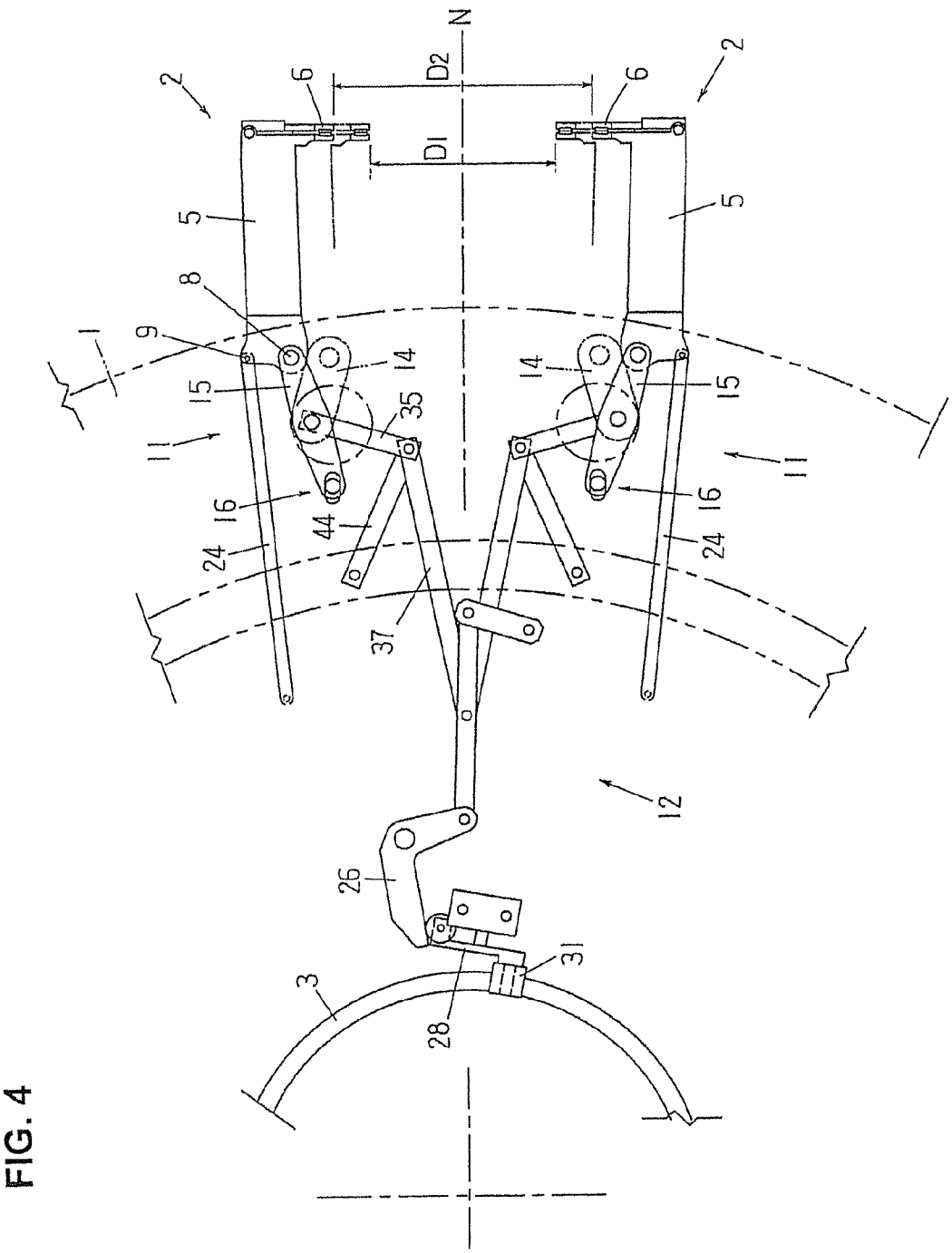
FIG. 4 is a partial top view of the bag transfer device shown in FIGS. 1 to 3 and illustrates the action of a spacing adjustment mechanism thereof for left and right grippers.

FIG. 4 shows the positions of the various levers and links, and the positions of the grippers 2, when the cylindrical cam 3 has been lowered by a specific height. The left and right grippers 2 are moved symmetrically with the reference plane N in between them, and the spacing between the grippers 2 (or the clamping components 6) increases from D1, which is indicated by two-dot chain lines, to D2, which is indicated by solid lines. Even though the spacing between the grippers 2 (or the clamping components 6) increases, the clamping faces of the clamping components 6 are maintained in substantially the same plane (a plane substantially perpendicular to the reference plane N), and there is substantially no displacement in the thickness direction of the bag 7 (the normal direction of the transfer path of the bag 7 clamped by the clamping components 6). Naturally, all of the pairs of the left and right grippers 2 installed on the table 1 assume this new reference layout.

As seen from the above, in the above-described bag transfer device, just as in the bag transfer device of Japanese Utility Model Application Publication No. H5-28169, the spacing between the grippers 2 (the clamping components 6) can be changed according to the bag size (bag width) by raising or lowering the cylindrical cam 3; however, any tilting of the clamping faces of the clamping components 6 of the left and right grippers 2 and any change in the transfer path of the bags (deviation in the thickness direction of the bags) can be substantially prevented.

Meanwhile, when the cylindrical cam 3 reverses its rotation while the table 1 is intermittently rotating, the cam follower 31 of the cam lever 29 is rotated and moved up and down over the cam face of the cylindrical cam 3, and the drive force of the cam is transmitted through the pivot lever 26 and the various links constituting the drive force transmission mechanism 12 to the second links 15 of the arm support mechanisms 11, as described above. The grippers 2 are moved intermittently along the movement path; and in the course of this movement (during the intermittent stops), the arms 5 are moved substantially perpendicular to the reference plane N according to the shape (protrusion) of the cam face of the cylindrical cam 3, and the spacing between the grippers 2 (the spacing between the clamping components 6) is changed. In this situation as well, as described above, the clamping faces of the clamping components 6 are maintained in substantially the same plane (a plane substantially perpendicular to the reference plane N), and there is substantially no displacement in the thickness direction of the bag 7 (the normal direction of the transfer path of the bag 7 clamped by the clamping components 6).

As seen from the above, in the bag transfer device of the present invention, even when the left and right spacing of the grippers is increased or decreased while the grippers are being moved intermittently along the movement path, tilting of the clamping faces of the clamping components of the grippers and changes in the transfer path of the bags can be substantially prevented.

Figure 5:
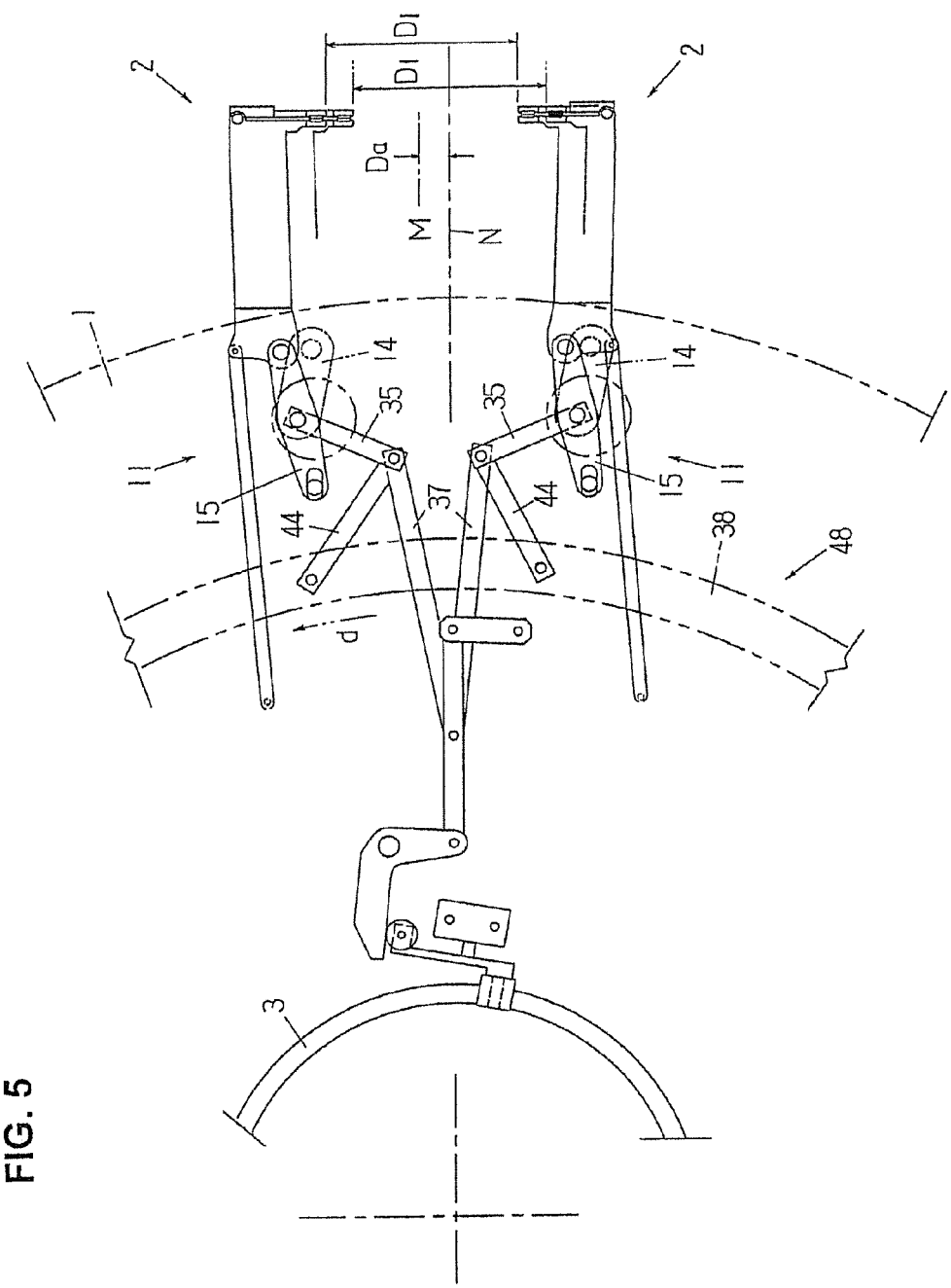
FIG. 5 is a partial top view of the bag transfer device shown in FIGS. 1 to 3 and illustrates the action of a gripper position adjustment mechanism thereof.

The action of the gripper position adjustment mechanism 48 will now be described with reference to FIG. 5.

When the motor 42 (see FIG. 3) is actuated and the threaded shaft 41 is rotated, the gripper position adjustment ring 38 is rotated relative to the table 1 (the rotation direction is indicated by the arrow d), and one end of each one of the pair of seventh links 44 is moved together with the gripper position adjustment ring 38. Consequently, the pairs of the seventh links 44, the sixth links 37, and the fifth links 35 are moved to asymmetrical positions with respect to the reference plane N, resulting in that the second links 15 are moved to asymmetrical positions with respect to the reference plane N.

Accordingly, the left and right grippers 2 are displaced substantially in the perpendicular direction with respect to the reference plane N while more or less maintaining the original spacing D1 (displaced from the position of the two-dot chain line to the position of the solid line). The vertical plane (center plane M) that passes through the center of the left and right grippers 2 is also displaced from the reference plane N (by a displacement amount Da). The center plane M is parallel to the reference plane N. This layout of the left and right grippers 2 is called an eccentric layout in the present invention. The displacement amount Da can be selected as needed from within a specific range.

When the cylindrical cam 3 is raised and lowered, or the table 1 is intermittently rotated (and the cylindrical cam 3 is rotated forward and backward at the same time), the left and right grippers 2 basically maintain the above-described eccentric layout while their spacing is increased or decreased substantially in a symmetric fashion with respect to the center plane M in between. Even though the left and right grippers 2 assume this eccentric layout, when the cylindrical cam 3 is raised or lowered, or while the left and right grippers 2 are moved intermittently along the movement path, the clamping faces of the clamping components 6 are maintained in substantially the same plane (a plane substantially perpendicular to the reference plane N), and there is substantially no displacement in the thickness direction of the bag 7 (the normal direction of the transfer path of the bag 7 clamped by the clamping components 6).

Next, a first significance of the left and right grippers 2 that take the above-described eccentric layout will be described below briefly (first example).

The description will be made for the bag transfer device shown in FIGS. 1 to 3 that is incorporated in, for example, the bag filling and packaging apparatus of Japanese Utility Model Application Publication No. H5-28169; and in this the bag filling and packaging apparatus, bag filling steps including the supply of bags to the grippers 2, the opening of the bag mouth, the filling of the bag with its contents, the sealing of the bag mouth, the cooling of the sealed part of the bag, the removal of the sealed bag from the grippers, and other steps are carried out in order at the various stop positions of the grippers 2. In addition, in this bag filling and packaging apparatus, generally, a bag feed device, a bag opening device, a bag filling device, a bag sealing device, a bag cooling device, and so forth that perform the above steps are installed at various stop positions, using the reference plane N as a reference. More specifically, a bag feed device, for example, is installed so that the center line of each of the bags fed to the grippers 2 (the center line being a straight line that passes through the center of a bag in the width direction) is located on the reference plane N, a bag opening device, for example, is installed so that a pair of suction cups thereof are moved back and forth over the reference plane N, and a liquid filling device, for example, is installed so that the filling nozzle is moved up and down within the reference plane N.

Figure 6A:
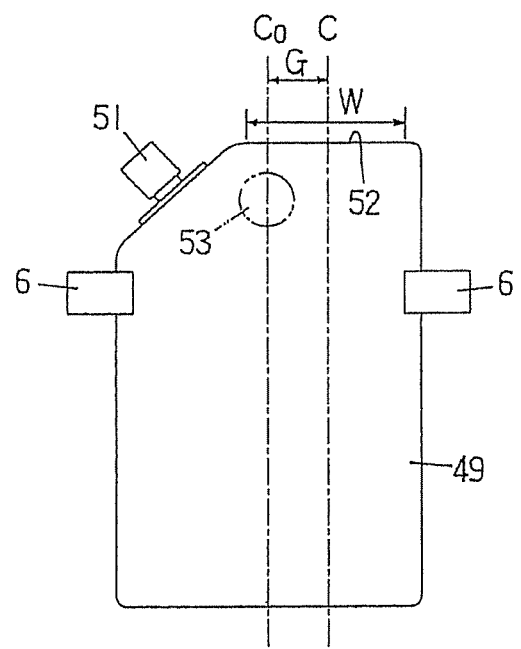
FIGS. 6A and 6B illustrate the significance of left and right grippers having an eccentric layout in transferring bags having spouts by the bag transfer device of the present invention used in a bag filling and packaging apparatus, in which spouts are attached to the upper end corners of bags.

In this bag filling and packaging apparatus with the bag transfer device shown in FIGS. 1 to 3 incorporated, when the bag 49 shown in, for example, FIG. 6A is to be filled with a liquid, the following problems are encountered if the layout (or the location) of the left and right grippers 2 is the reference layout. Here, the bag 49 is a spouted bag (or a bag provided with a spout) in which a spout 51 is attached to the upper end corner, and the horizontal upper edge (the open part 52) is open at an opening width W. The center line C (a straight line that passes through the center of the open part 52 in the width direction) of the open part 52 is offset from the center line C0 of the bag 49 (offset width G).

The center line C0 of the bag 49 supplied by a bag feed device to the left and right grippers 2 (the clamping components 6) is located on the reference plane N. When the grippers 2 stop at the stop position where the bag opening step is performed, the pair of suction cups 53 (only one of the two cups shown) are moved forward and adhere to the faces of the bag 49, as indicated by the two-dot chain line in FIG. 6A. However, this suction location lies on the center line C0 (in the reference plane N) of the bag 49 and is offset by the offset width G from the center line C of the open part 52; accordingly, there is interference to open (or difficulty in opening) the open part 52 of the bag, and the open part 52 is not fully opened. Also, in the bag filling step, the filling nozzle is moved up and down along the center line C0 (in the reference plane N), which is greatly offset from the center line C of the open part 52; accordingly, in the bag filling step as well, there is interference (or difficulty) in the insertion of the filling nozzle into the open part 52, and the filling nozzle might fail to enter the bag properly.

If, however, the suction position of the suction cups 53 is adjusted so that this position lies on the center line C of the open part 52, then there will be no interference (or difficulty) in the opening of the open part 52. Also, if the raising and lowering position of the filling nozzle is adjusted so that this nozzle is raised and lowered along the center line C of the open part 52, there will be no interference in the insertion into the open part 52. These adjustments are not limited to the opening device and the filling device only, and such adjustments must also be done for the other and subsequent devices; and if the type of bag being processed changes to an ordinary flat bag, it will be necessary to adjust back to the original reference plane N, and this can lead to a significant drop in the productivity of the bag filling and packaging apparatus.

One example of a bag filling and packaging apparatus that is for bags having spouts at corners such as these as described above is Japanese Patent Application Laid-Open (Kokai) No. 2009-220853.

Figure 6B:
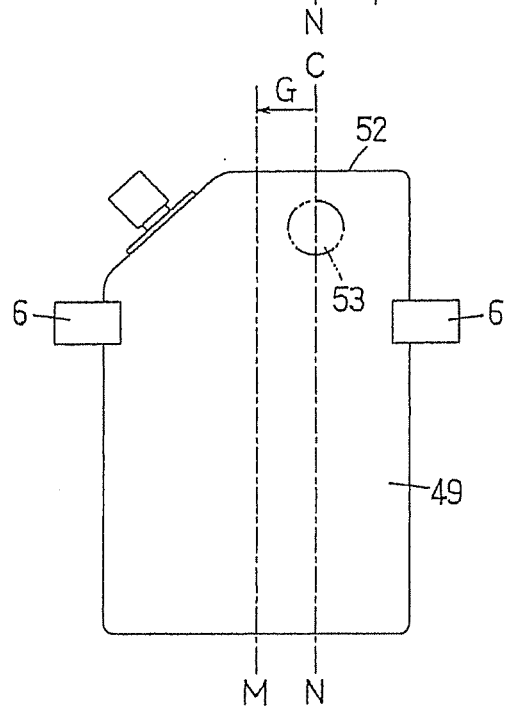

However, with the use of the bag transfer device shown in FIGS. 1 through 3, if the layout (location) of the left and right grippers 2 is an eccentric layout, this can solve all of the problems described above. The bag opening device, bag filling device, and other devices used to carry out the bag filling process can be left set as they are, using the reference plane N as a reference; and only the bag feed device will need to be adjusted so that the center line C of the open part 52 of the bag 49 supplied to the left and right grippers 2 (the clamping components 6) is located on the reference plane N. FIG. 6B shows a state when a vertical plane (center plane M) that passes through the center of the left and right grippers 2 (the clamping components 6) is displaced from the reference plane N (displacement amount G), and the center line C of the open part 52 is located on the reference plane N. By thus putting the left and right grippers 2 in an eccentric layout, the suction position of the suction cups 53 is substantially exactly on the center line C of the open part 52 (on the reference plane N), the filling nozzle is raised and lowered along the center line C of the open part 52 (on the reference plane N), and there is no interference (or difficulty) in opening or filling the bags; and the same applies to other subsequent devices.

Next, a second significance of the left and right grippers 2 that takes the above-described eccentric layout will be described below briefly (second example).

The bag transfer device shown in FIGS. 1 to 3 is incorporated in, for example, a spout attachment apparatus (see Japanese Patent No. 3,261,543); and in this spout attachment apparatus, spout attachment steps including the supply of bags to the grippers 2, the corner cutting of the bag mouth (only when a spout is to be provided at a corner), the opening of the bag mouth, the insertion of the spout into the bag mouth, the temporary sealing of the bag and spout, the main sealing of the bag and spout, the cooling of the sealed part, the removal of the spouted bag from the grippers 2, and other steps are carried out in order at the various stop positions of the grippers 2 (in the device of the above-described Japanese Patent No. 3,261,543, filling with the contents is performed after the main sealing of the bag and spout, but in this spout attachment device filling with a liquid is not performed).

Figure 7A:
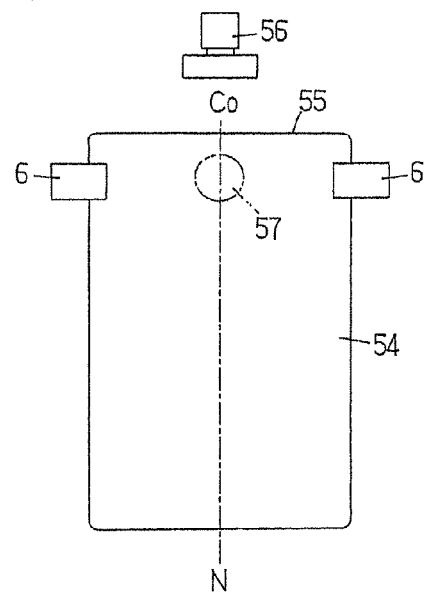
FIGS. 7A through 7C illustrate the significance of left and right grippers having an eccentric layout in transferring bags having spouts by the bag transfer device of the present invention used in a spout attachment device.

When, as seen from FIG. 7A, a spout attachment device is used to attach a spout 56 to the center of the open part 55 at upper end of a bag 54 that has a rectangular shape in the top view of FIG. 7A, the layout (or the location) of the left and right grippers 2 (the clamping components 6) is the reference layout, and a bag feed device, a bag opening device, a spout insertion and temporary sealing device, a main sealing device, a cooling device, and so forth that perform the above steps are installed at various stop positions, using the reference plane N as a reference. More specifically, a bag feed device, for example, is installed so that the center line C0, which is a straight line that passes through the center in the width direction of the bag 54 supplied to the grippers 2 (the clamping components 6), is located in the reference plane N, a bag opening device is installed so that a pair of suction cups 57 are moved back and forth over the reference plane N, and a spout insertion and temporary sealing device is installed so that the spout 56 descends over the reference plane N and is inserted into the open part 55 of the bag 54.

Figure 7B:
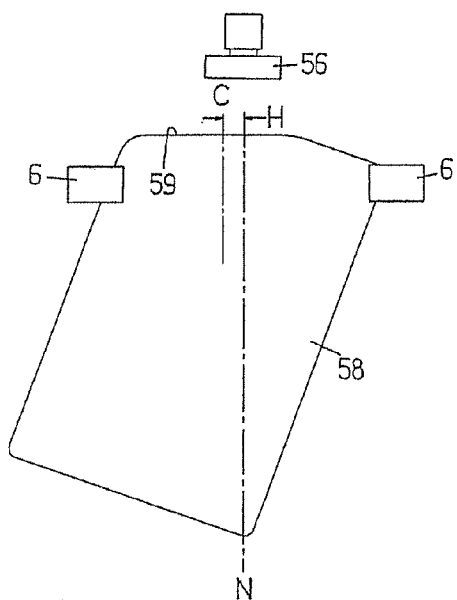

Using this spout attachment device, when the edges of a bag 58 shown in FIG. 7B, for example, are clamped by the left and right grippers 2 (the clamping components 6) so that the corner opening 59 that has been cut at an angle is set horizontal, and the spout 56 is attached to the center of this corner opening 59, if the left and right grippers 2 (the clamping components 6) remain in the reference layout, the insertion position of the spout 56 deviates from the center line C of the corner opening 59 (offset width H).

Figure 7C:
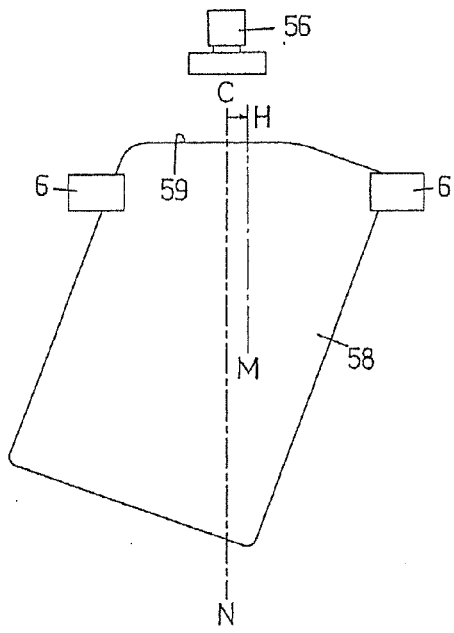

However, with the use of the bag transfer device of FIGS. 1 through 3, as shown in FIG. 7C, the insertion position of the spout 56 can be matched to the center line C of the corner opening 59 by displacing (displacement amount H) the vertical plane (the center plane M) passing through the center of the left and right grippers 2 (the clamping components 6) and thereby eliminating the offset width H. The spout insertion and temporary sealing device and other devices used to perform the spout attachment process can remain installed using the reference plane N as a reference. Only the bag feed device of the spout attachment apparatus needs to be adjusted so that the center line C of the corner opening 59 of the bag 58 supplied to the left and right grippers 2 (the clamping components 6) is located on the reference plane N. Thus putting the left and right grippers 2 in an eccentric layout allows the spout 56 to be inserted and attached in the center of the corner opening 59.

Figure 8:
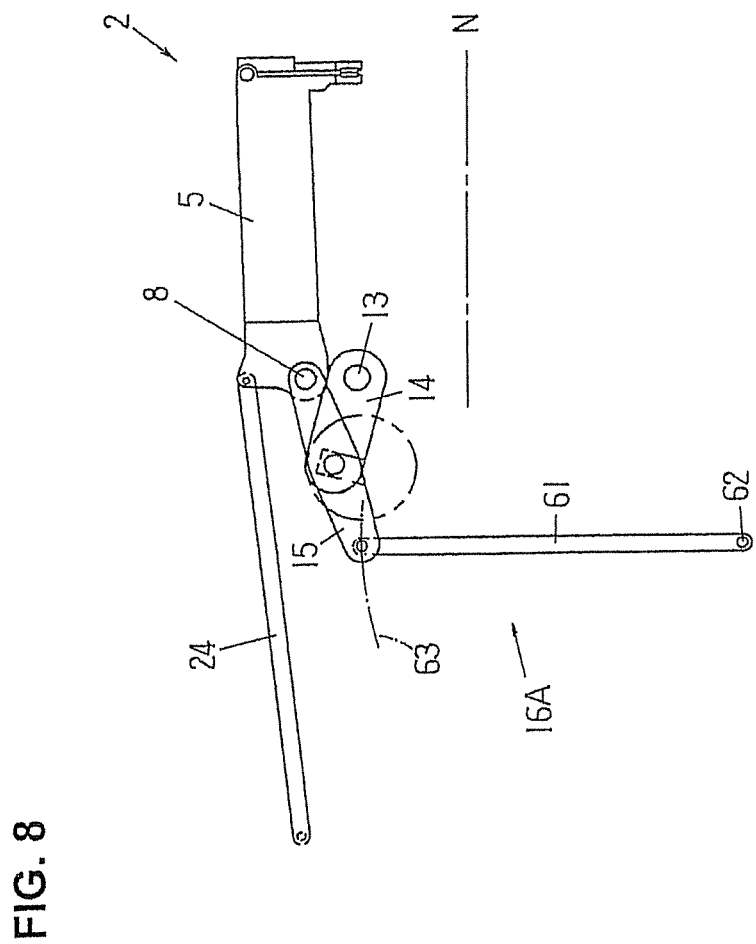
FIG. 8 is top view of main components of a first restricting mechanism of another example.
Figure 9:
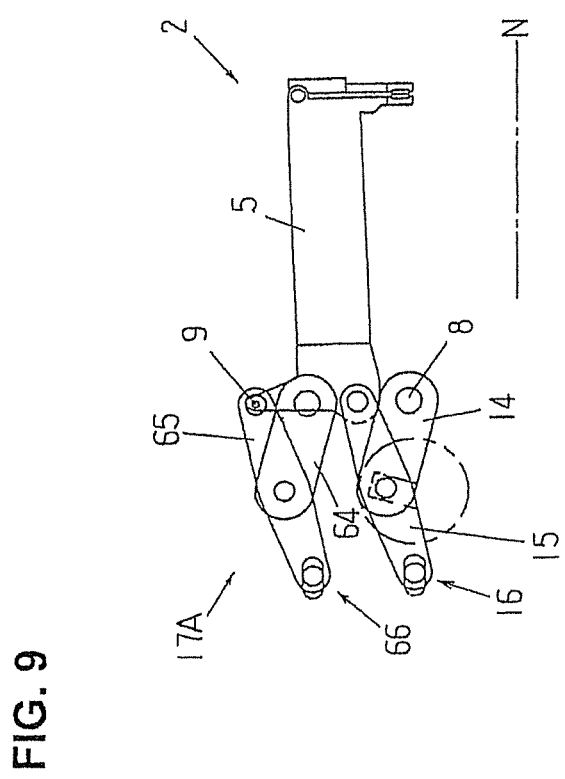
FIG. 9 is top view of main components of a second restricting mechanism of another example.

Next, referring to FIGS. 8 to 10, alternative mechanisms for the first and second restricting mechanisms 16 and 17 of the arm support mechanism 11 of the spacing adjustment mechanism 4, will be described below. In FIGS. 8 to 10, members that are substantially the same as those in the bag transfer device shown in FIGS. 1 to 3 will be numbered the same.

The first restricting mechanism 16 serves to restrict the movement direction of the other end (that is opposite from the end having the first support shaft 8) of the second link 15 of the arm support mechanism 11 so that the other end will be parallel to the reference plane N (substantially perpendicular to the width direction of the bag 7 clamped by the clamping components 6); and in the structure above shown in FIGS. 1 to 3, it comprises the first sliding member 21 installed at the other end of the second link 15 and the first restricting member (part of the table 1) in which the first slot 22 is formed.

One example of the alternative mechanism will be described below with reference to FIG. 8, and this alternative first restricting mechanism 16A is comprised of a restricting link 61 that is linked at one end to the table 1 so as to be pivotable in a horizontal plane. The restricting link 61 extends substantially perpendicular to the reference plane N; and it is linked at one end thereof to a support shaft 62 installed on the table 1, is pivotable in a horizontal plane, and is linked at another end thereof to the other end of the second link 15. The other end of the second link 15 is movable substantially parallel to the reference plane N (along a movement path 63), and the first link 14, the second link 15, and the first restricting mechanism 16A approximate a Scott-Russell mechanism; and when the other end of the second link 15 is moved along the movement path 63, the one end (the first support shaft 8) of the second link 15 is moved substantially perpendicular to the reference plane N.

The second restricting mechanism 17 serves to restrict the movement direction of the second support shaft 9 so that the movement direction is substantially perpendicular to the reference plane N; and in the structure above shown in FIGS. 1 to 3, it comprises the restricting link 24 that is linked to the table 1 so as to be pivotable in a horizontal plane.

One example of the alternative mechanism will be described with reference to FIG. 9; and this alternative second restricting mechanism 17A is the same as the Scott-Russell mechanism (that is formed by the first link 14, the second link 15, and the first restricting mechanism 16) that restricts the movement direction of the first support shaft 8; and this alternative second restricting mechanism 17A is comprised of a first link 64 (same as the first link 14) that is pivotable in a horizontal plane, a second link 65 (same as the second link 15) that is linked at one end thereof to the second support shaft 9 and is linked in the center to the other end of the first link 64, and a restricting mechanism 66 (same as the first restricting mechanism 16) that restricts the movement direction of the other end of the second link 65. Accordingly, when one end (the first support shaft 8) of the second link 15 is moved perpendicular to the reference plane N, one end (the second support shaft 9) of the second link 65 is also moved perpendicular to the reference plane N.

Figure 10B:
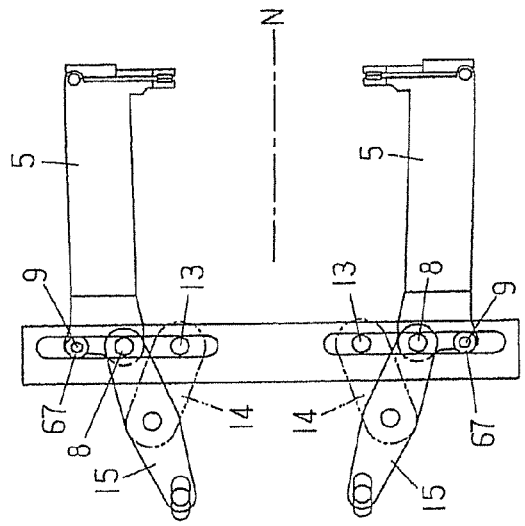
FIG. 10B is a cross sectional view taken along the line 10A-10A of FIG. 10A.
Figure 10A:
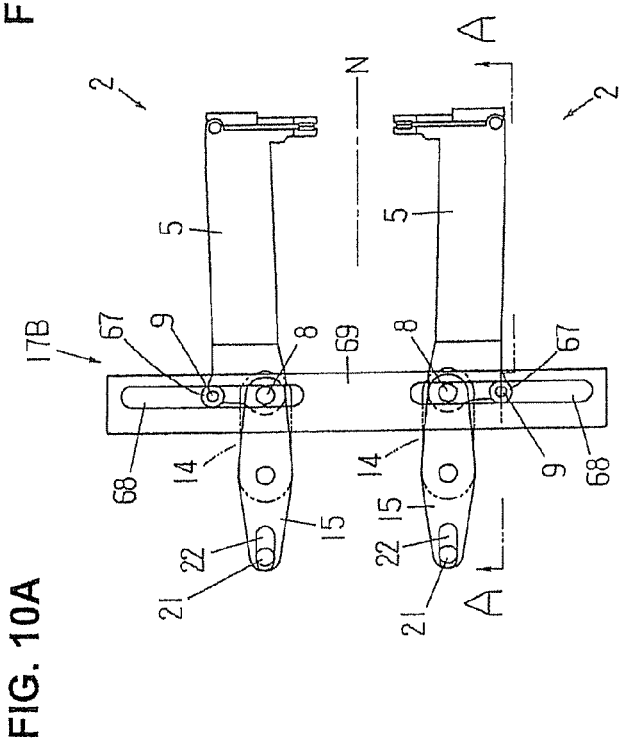
FIG. 10A is a top view of main components of yet another example of a second restricting mechanism.
Figure 10C:
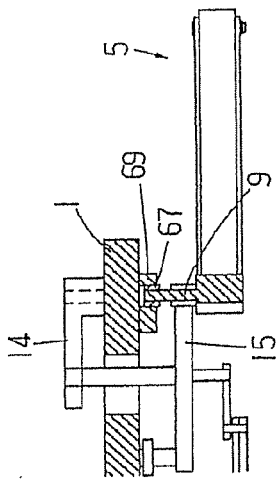
FIG. 10C is a top view of main component for illustrating the action of this second restricting mechanism.

FIGS. 10A through 10C show an example of another (second) alternative mechanism of the second restricting mechanisms 17. This alternative second restricting mechanism 17B comprises second sliding members 67 that are installed on the second support shafts 9 (in this example, rollers installed rotatably in a horizontal plane on the second support shafts 9) and a second restricting member 69 that is fixed horizontally to the under surface of the table 1 and in which second slots 68 are formed so that the second sliding members 67 are fitted in the slots 68. Each of the second slots 68 is perpendicular to the lengthwise direction of the first slots 22 (perpendicular to the reference plane N), and each of the second sliding members 67 is fitted in the second slot 68 in a slidable fashion in the length direction of the second slot 68. In this structure, two second slots 68 are formed in the second sliding member 67 so as to correspond to a total of two second sliding members 67 installed on the second support shafts 9 of the pair of arms 5. Just as in the first restricting member described above (in which the first slots 22 are formed), the second slots 68 can also be formed in the table 1. Accordingly, when one end (the first support shaft 8) of each of the second links 15 is moved perpendicular to the reference plane N, the second support shaft 9 is also moved perpendicular to the reference plane N, and the grippers 2 are moved symmetrically to each other and perpendicular to the reference plane N.

Figure 11:
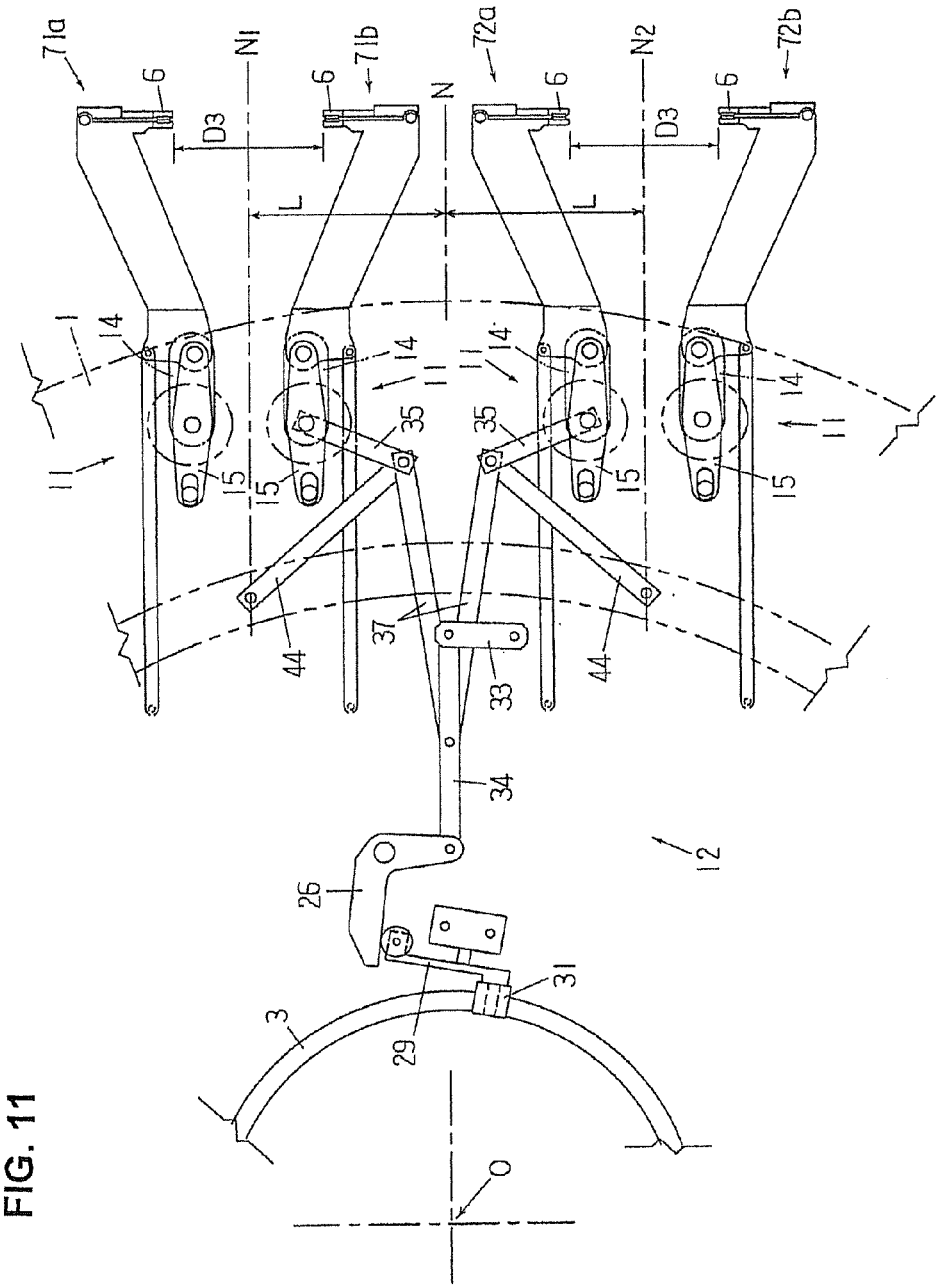
FIG. 11 is a partial top view of a double bag transfer device according to the present invention, in which members disposed below the table are illustrated by solid lines.
Figure 12:
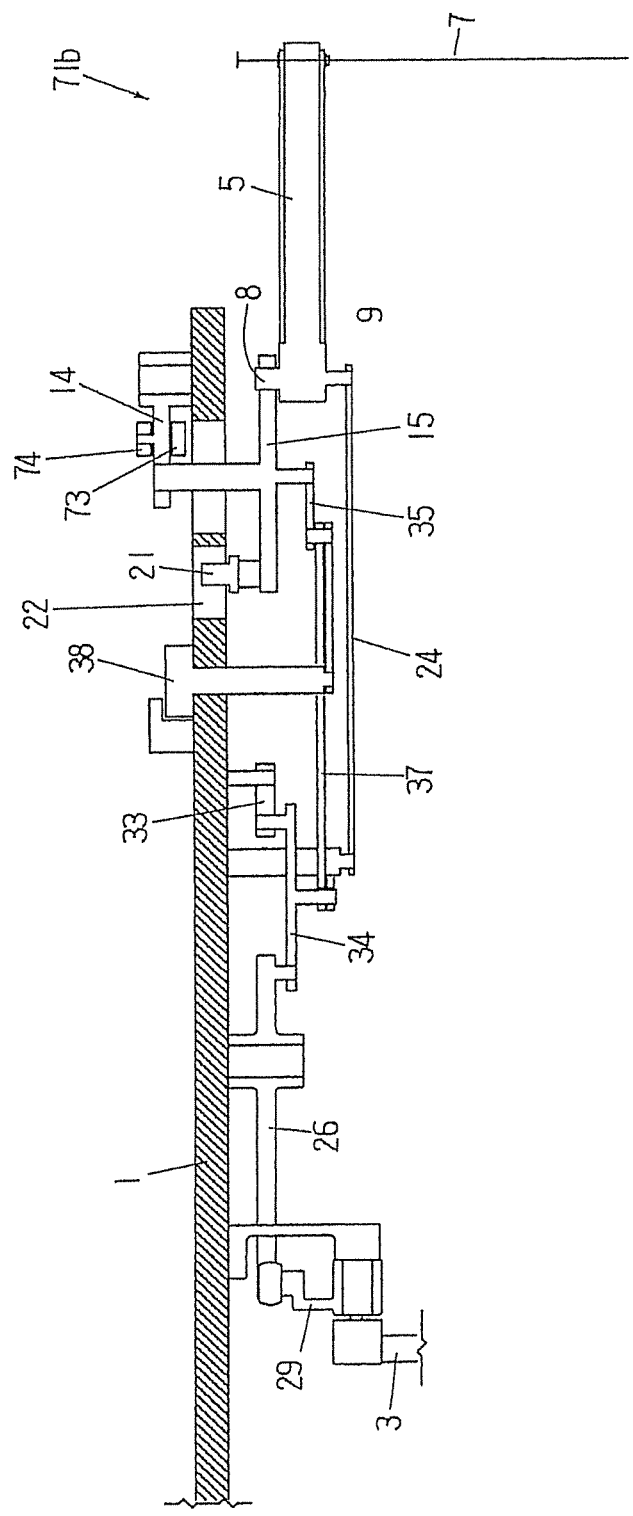
FIG. 12 is a partially cross-sectional partial side view of the bag transfer device shown in FIG. 11.
Figure 13:
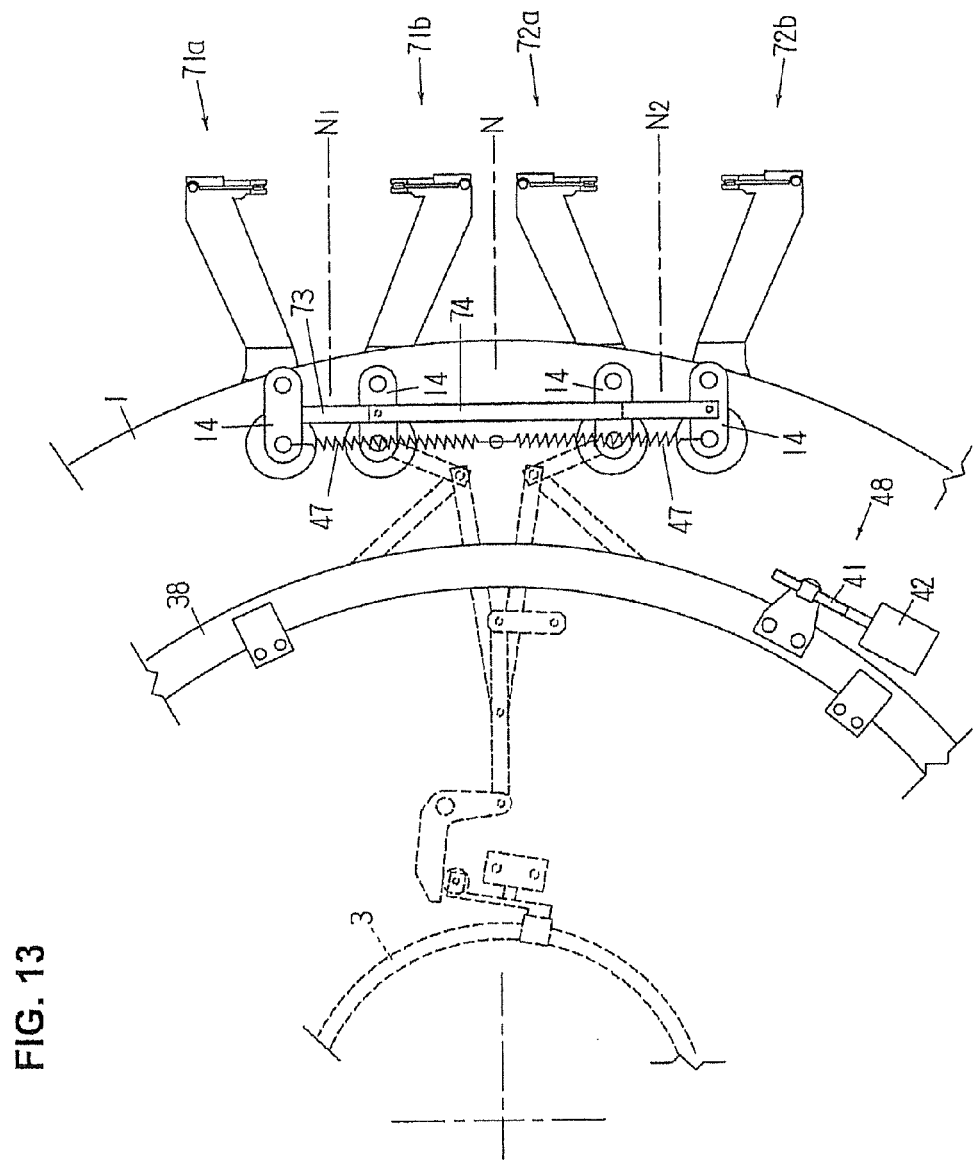
FIG. 13 is a partial top view of the bag transfer device shown in FIGS. 11 and 12, in which members disposed above the table are mainly illustrated.

FIGS. 11 to 13 show a double bag transfer device. In FIGS. 11 to 13, components that are substantially the same as those of the single bag transfer device shown in FIGS. 1 to 3 will be numbered the same when appropriate. A double bag transfer device is applied to, for example, a double rotary bag filling and packaging apparatus (disclosed in Japanese Patent Application Laid-Open (Kokai) No. 2004-244085). The double bag transfer device shown in FIGS. 11 to 13 will now be described below, focusing on the portion that differs from the single bag transfer device of FIGS. 1 to 3.

In a double bag transfer device, an even number of pairs of left and right grippers are provided around the table 1 that rotates intermittently and at a constant angle each time in a horizontal plane. As the table 1 rotates intermittently, the left and right gripper pairs are moved along an annular movement path, and (for instance, two) bags clamped by (for instance, two pairs of) left and right grippers are transferred simultaneously along the circular movement path.

In FIG. 11, two adjacent pairs of left and right grippers (one pair of grippers 71a and 71b, and another pair of grippers 72a and 72b) are disposed symmetrically with respect to a vertical planes N (a vertical plane that passes through the axis O of the table 1) that is perpendicular to a tangent to the movement path or the transfer path. The pair grippers 71a and 71b are disposed symmetrically with respect to a vertical plane (vertical sub-plane) N1 that is parallel to the vertical plane (vertical main plane) N and is a specific distance (distance L) away from the reference plane N on the downstream side of the movement path. The other pair of grippers 72a and 72b are disposed symmetrically with respect to a vertical plane (vertical sub-plane) N2 that is parallel to the vertical plane (vertical main plane) N and is a specific distance (distance L) away from the reference plane N on the upstream side of the movement path.

As these grippers 71a and 71b are moved along the movement path, the spacing between them increases or decreases symmetrically with respect to the vertical plane N1; and as the grippers 72a and 72b are moved along the movement path, the spacing between them increases or decreases symmetrically with respect to the vertical plane N2. This layout of the two adjacent pairs of left and right grippers 71a and 71b and also 72a and 72b in the double bag transfer device is called a reference layout in the present invention, and the vertical planes N, N1, and N2 are called reference planes (hereinafter referred to as the reference plane N, the reference plane N1, and the reference plane N2). It should go without saying that the reference plane N, the reference plane N1, and the reference plane N2 are planes that are set on the table 1 and are rotated intermittently around the axis O as the table 1 rotates intermittently. Also, all of the pairs of left and right grippers installed on the table 1 take this reference layout together with the adjacent pairs of left and right grippers.

In this double bag transfer device, one arm support mechanism 11 is installed for each of the two pairs of left and right grippers 71a and 71b and also 72a and 72b, and a single drive force transmission mechanism 12 common to these two pairs is provided. The other ends of the fifth links 35 of the drive force transmission mechanism 12 are linked respectively to the centers of the second links 15 of the gripper 71b and the gripper 72a. As seen from FIGS. 12 and 13, of the grippers 71a and 71b, the gripper 71a, which is on the downstream side (of the rotating table), has an arm support mechanism 11 that is linked to a first connecting link 73; and of the grippers 72a and 72b, the gripper 72a, which is on the downstream side (of the rotating table), has an arm support mechanism 11 that is linked to the first connecting link 73. The arm support mechanisms 11 of the grippers 71b and 72b on the upstream side are linked to a second connecting link 74.

More specifically, the first connecting links 73 are linked to the first links 14 that are part of the arm support mechanisms 11 of the grippers 71a and 72a, while the second connecting links 74 are linked to the first links 14 that are part of the arm support mechanisms 11 of the grippers 71b and 72b. Accordingly, movement of the arm support mechanism 11 of the gripper 71b is transmitted directly to the arm support mechanism 11 of the gripper 72b, and movement of the arm support mechanism 11 of the gripper 72a is transmitted directly to the arm support mechanism 11 of the gripper 71a. As a result, the grippers 71a and 72a make the same movement in synchronism with each other, and the grippers 71b and 72b make the same movement in synchronism with each other as well.

Each of two biasing members (tension springs 47) is provided as part of the drive force transmission mechanism 12, and it is connected at one end thereof to the table 1 and at another end thereof to each of the first links 14 of the grippers 71a and 72b.

In FIG. 11, the spacing between the grippers 71a and 71b and the spacing between the grippers 72 and 72b (the spacing of the clamping components 6) are D3 for both. The clamping faces of the clamping components 6 of the grippers 71a and 71b and those of the grippers 72a and 72b lie in a vertical plane that is perpendicular to the reference plane N and also lie in substantially the same plane. Similarly, the width direction of the bag clamped by the left and right clamping components 6 is always perpendicular to the reference plane N.

When the cylindrical cam 3 is moved up or down, just as in the single bag transfer device shown in FIGS. 1 to 3, the cam follower 31 of the cam lever 29 moves up or down, and drive force caused thereby is transmitted, through the various links and the pivot levers 26 constituting the drive force transmission mechanism 12, to the second links 15 of the arm support mechanisms 11 of the grippers 71b and 72a. As a result, the grippers 71b and 72a are moved symmetrically to each other and substantially perpendicular to the reference plane N; and at the same time, the grippers 71a and 72b are moved symmetrically to each other and substantially perpendicular to the reference plane N. The movement of the pair of grippers 71a and 71b is symmetrical on either side of the reference plane N1, and the movement of the pair of grippers 72a and 72b is symmetrical on either side of the reference plane N2.

Figure 14:
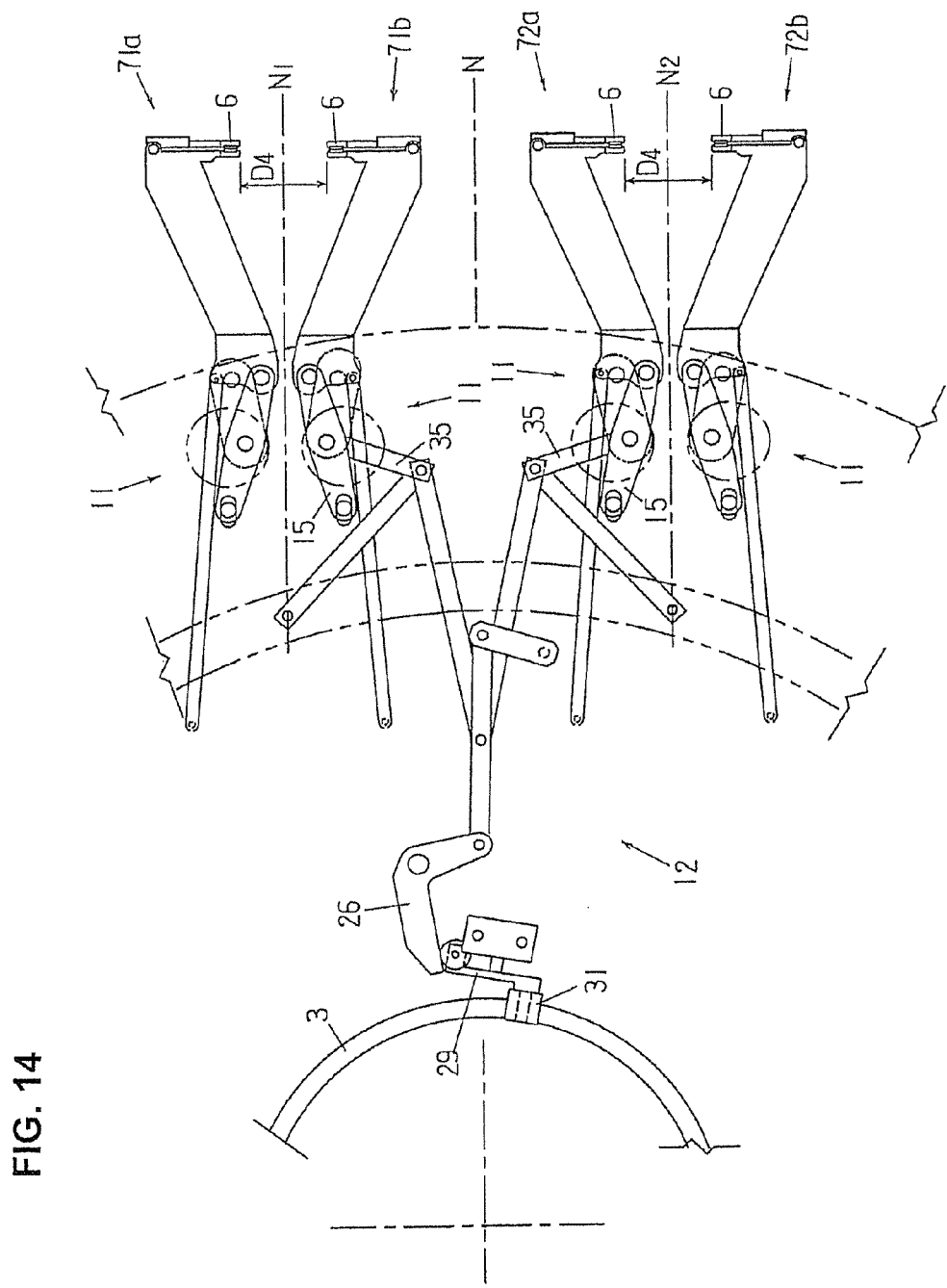
FIG. 14 is a partial top view of the bag transfer device shown in FIGS. 11 to 13 and illustrates the action of a spacing adjustment mechanism employed for left and right grippers.

FIG. 14 shows the positions of the various links and levers when the cylindrical cam 3 is lowered a specific distance, and it also shows the positions of the grippers 71a and 71b and grippers 72a and 72b. The grippers 71a and 71b are moved in substantially a symmetric fashion with the perpendicular plane N1 in between them, and grippers 72a and 72b are moved in substantially a symmetric fashion with the perpendicular plane N2 in between them. The spacing between the grippers 71a and 71b (clamping components 6) and the spacing between the grippers 72a and 72b (clamping components 6) narrow from D3 (shown in FIG. 11) to D4. Even though the spacing between the grippers 71a and 71b and the spacing between the grippers 72a and 72b change, the clamping faces of the clamping components 6 are maintained in substantially the same plane (a plane that is substantially perpendicular to the reference plane N), and there is substantially no displacement in the bag thickness direction (the normal direction of the transfer path of the bags clamped in the clamping components 6).

As seen from the above, in the double bag transfer device of the present invention, the spacing of the left and right clamping components of the grippers 71a and 71b and the grippers 72a and 72b can be varied according to the bag size (bag width) by raising or lowering the cylindrical cam 3; and in such varying in bag size, tilting of the clamping faces of the clamping components 6 of the grippers 71a and 71b and of the grippers 72a and 72b and changes in the transfer path of the bags (deviation in the thickness direction of the bags) can be substantially prevented.

Although not described in detail, the same applies when the table 1 rotates intermittently (with the cylindrical cam 3 rotating forward and backward at the same time), and the cam follower 31 of the cam lever 29 is moved up and down by rotating over the cam face of the cylindrical cam 3.

Figure 15:
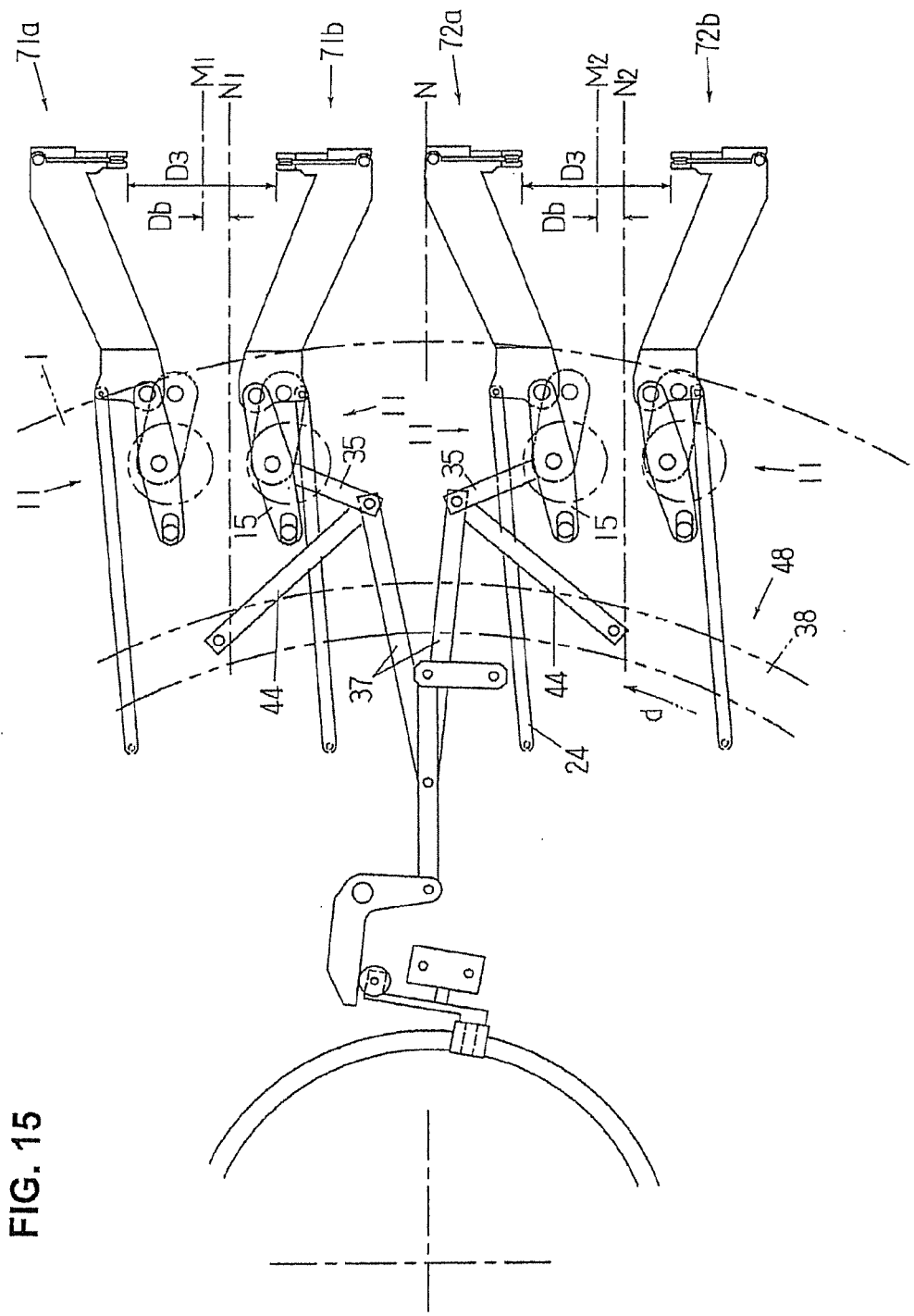
FIG. 15 is a partial top view of the bag transfer device shown in FIGS. 11 to 13 and illustrates the action of a gripper position adjustment mechanism.

The action of the gripper position adjustment mechanism 48 will be described below with reference to FIG. 15.

When the motor 42 (see FIG. 13) is actuated and the threaded shaft 41 is rotated, the gripper position adjustment ring 38 is rotated relative to the table 1 (the rotation direction is indicated by the arrow d), and one end of each of the seventh links 44 is moved together with the gripper position adjustment ring 38. Consequently, the seventh links 44, the sixth links 37, and the fifth links 35 are moved to asymmetrical positions with respect to the reference plane N, and this is accompanied by movement of the second links 15 of the arm support mechanisms 11 of the grippers 71b and 72a to asymmetrical positions with respect to the reference plane N. At the same time, the second links 15 of the arm support mechanisms 11 of the grippers 71a and 72b are also moved in the same direction.

As a result, the grippers 71a and 71b and the grippers 72 and 72b are displaced (displacement amount Db) in the direction that is substantially perpendicular to the reference plane N while the original spacing D3 is more or less maintained. The vertical planes (center planes M1 and M2) that pass through the center of the grippers 71a and 71b and the grippers 72 and 72b, respectively, after displacement are offset by the displacement amount Db with respect to the reference planes N1 and N2. The center planes M1 and M2 are parallel to the reference planes N1 and N2, respectively. This layout of the grippers 71a and 71b and of the grippers 72a and 72b is called an eccentric layout in the present invention. It should go without saying that all of the pairs of left and right grippers installed on the table 1 assume this new eccentric layout along with the pair of adjacent left and right grippers.

When the cylindrical cam 3 is raised or lowered, or when the table 1 rotates intermittently, the two sets of grippers 71a and 71b and also 72a and 72b basically keep this eccentric layout while their spacing is increased or decreased substantially in a symmetric fashion with the center planes M1 and M2 in between. Even when the two sets of grippers 71a and 71b and grippers 72a and 72b assume an eccentric layout, as long as these grippers are moved along the movement path, the clamping faces of the clamping components 6 are maintained in substantially the same plane (a plane that is substantially perpendicular to the reference plane N), and substantially no displacement occurs for the clamping faces in the bag thickness direction (the normal direction of the transfer path of the bags clamped by the clamping components 6).

The invention claimed is:

1. A bag transfer device,
which comprises:
a conveying member that rotates in a horizontal plane,
a plurality of pairs of grippers that are disposed on the conveying member and moved along an annular movement path as the conveying member rotates, and
a spacing adjustment mechanism that increases or decreases a spacing within a horizontal plane of the pair of grippers while the plurality of pairs of grippers are being moved along the movement path; and
in which
each gripper is composed of an arm and a clamping component installed at a distal end of the arm,
the clamping components of the grippers clamp side portions of a bag, and
the bag is transferred along an annular transfer path;
wherein
the spacing adjustment mechanism comprises:
an arm support mechanism disposed at each arm of the grippers, and
a drive force transmission mechanism that operates the arm support mechanism;
first and second support components are set at a base portion of each arm and separated by a specific distance in a horizontal direction; and
the arm support mechanism comprises:
a first link that is linked at one end thereof to the conveying member and is pivotable within a horizontal plane,
a second link that is linked at one end thereof to the first support component and is linked at a middle portion thereof to another end of the first link,
a first restricting mechanism that restricts a movement direction of the other end of the second link such that the movement direction is perpendicular to a width direction of a bag clamped by the clamping components of the grippers, and
a second restricting mechanism that is linked to the second support component and restricts a movement direction of the second support component such that the movement direction is parallel to the width direction of the bag clamped by the clamping components of the grippers;
the first link, the second link, and the first restricting mechanism constitute a Scott-Russell mechanism; and
the drive force transmission mechanism transmits drive force to the second links so as to operate the Scott-Russell mechanism.

2. The bag transfer device according to claim 1, wherein
the conveying member is a table that intermittently rotates by a constant angle around a vertical axis thereof,
the plurality of pairs of grippers are disposed around the table, and
the movement path is in a circular shape.

3. The bag transfer device according to claim 2, wherein
a cylindrical cam whose center coincides with the axis of table and that is capable of up-and-down movement is provided under the table; and
the drive force transmission mechanism is comprised of:
a pivot lever that is linked at an intermediate position thereof to the table and is pivotable within a horizontal plane,
a cam lever that is disposed between the cylindrical cam and the pivot lever and is axially supported at an intermediate position thereof by the table, the cam lever having at one end thereof a cam follower that rotates over a cam face of the cylindrical cam with another end thereof coming into contact with one end of the pivot lever,
a third link that is provided more to an outer peripheral side of the table than the pivot lever and is linked at one end thereof to the table and pivotable within a horizontal plane,
a fourth link that extends in a radial direction of the table between the pivot lever and the third link, that is linked at one end thereof to another end of the pivot lever, and that is linked at another end thereof to another end of the third link,
a pair of fifth links, each of which being linked at one end thereof to the second link of the arm support mechanism,
a pair of sixth links, each of which being linked at one end thereof to an intermediate position of the fourth link and linked at another other end thereof to another end of each of the fifth link, and
a pair of seventh links, each of which being linked at one end thereof to the table and linked at another end thereof to the other end of each of the fifth links; and
when the cam follower of the cam lever rotates over the cam face of the cylindrical cam, drive force caused thereby is transmitted through the drive force transmission mechanism to the second link of the arm support mechanism.

4. The bag transfer device according to claim 3, wherein
a gripper position adjustment ring is provided on the table,
the gripper position adjustment ring coincides at a center thereof with the axis of the table, rotates intermittently together with the table and is able to rotate relative to the table, and
each of the seventh links is linked at the one end to the gripper position adjustment ring.

5. The bag transfer device according to claim 1, wherein
the first restricting mechanism is comprised of:
a first sliding member that is provided at the other end of the second link, and
a first restricting member that is provided on the conveying member which is formed therein with a first slot into which the first sliding member is fitted, and
the first sliding member is slidable in the lengthwise direction of the first slot.

6. The bag transfer device according to claim 2, wherein
the first restricting mechanism is comprised of:
a first sliding member that is provided at the other end of the second link, and
a first restricting member that is provided on the conveying member which is formed therein with a first slot into which the first sliding member is fitted, and
the first sliding member is slidable in the lengthwise direction of the first slot.

7. The bag transfer device according to claim 3, wherein
the first restricting mechanism is comprised of:
a first sliding member that is provided at the other end of the second link, and
a first restricting member that is provided on the conveying member which is formed therein with a first slot into which the first sliding member is fitted, and
the first sliding member is slidable in the lengthwise direction of the first slot.

8. The bag transfer device according to claim 4, wherein
the first restricting mechanism is comprised of:
a first sliding member that is provided at the other end of the second link, and a first restricting member that is provided on the conveying member which is formed therein with a first slot into which the first sliding member is fitted, and the first sliding member is slidable in the lengthwise direction of the first slot.

9. The bag transfer device according to claim 1, wherein the second restricting mechanism is comprised of a restricting link that is linked at one end thereof to the conveying member and linked at another end thereof to the second support component, and the restricting link is pivotable in a horizontal plane using the linked part of the one end as its axis and extends perpendicular to the width direction of the bag clamped by the clamping components of the grippers.

10. The bag transfer device according to claim 2, wherein the second restricting mechanism is comprised of a restricting link that is linked at one end thereof to the conveying member and linked at another end thereof to the second support component, and the restricting link is pivotable in a horizontal plane using the linked part of the one end as its axis and extends perpendicular to the width direction of the bag clamped by the clamping components of the grippers.

11. The bag transfer device according to claim 3, wherein the second restricting mechanism is comprised of a restricting link that is linked at one end thereof to the conveying member and linked at another end thereof to the second support component, and the restricting link is pivotable in a horizontal plane using the linked part of the one end as its axis and extends perpendicular to the width direction of the bag clamped by the clamping components of the grippers.

12. The bag transfer device according to claim 4, wherein the second restricting mechanism is comprised of a restricting link that is linked at one end thereof to the conveying member and linked at another end thereof to the second support component, and the restricting link is pivotable in a horizontal plane using the linked part of the one end as its axis and extends perpendicular to the width direction of the bag clamped by the clamping components of the grippers.

13. The bag transfer device according to claim 1, wherein the second restricting mechanism is comprised of a second sliding member that is provided on the second support component and a second restricting member that is provided on the conveying member which is formed therein with a second slot into which the second sliding member is fitted, and the second sliding member is provided slidable in the lengthwise direction of the second slot.

14. The bag transfer device according to claim 2, wherein the second restricting mechanism is comprised of a second sliding member that is provided on the second support component and a second restricting member that is provided on the conveying member which is formed therein with a second slot into which the second sliding member is fitted, and the second sliding member is provided slidable in the lengthwise direction of the second slot.

15. The bag transfer device according to claim 3, wherein the second restricting mechanism is comprised of a second sliding member that is provided on the second support component and a second restricting member that is provided on the conveying member which is formed therein with a second slot into which the second sliding member is fitted, and the second sliding member is provided slidable in the lengthwise direction of the second slot.

16. The bag transfer device according to claim 4, wherein the second restricting mechanism is comprised of a second sliding member that is provided on the second support component and a second restricting member that is provided on the conveying member which is formed therein with a second slot into which the second sliding member is fitted, and the second sliding member is provided slidable in the lengthwise direction of the second slot.

17. The bag transfer device according to claim 1, wherein the bag transfer device is a double bag transfer device in which an even number of pairs of grippers are provided;

two adjacent pairs of grippers have a common drive force transmission mechanism;

a first connecting link is provided to connect:
the arm support mechanism of the gripper, which is of one pair of grippers of adjacent two pairs of grippers and on a downstream side of the movement path, to
the arm support mechanism of the gripper, which is of another one pair of grippers of adjacent two pairs of grippers and on a downstream side of the movement path;

a second connecting link is provided to connect:
the arm support mechanism of the gripper, which is of one pair of grippers of adjacent two pairs of grippers and on an upstream side of the movement path, to
the arm support mechanism of the gripper, which is of another one pair of grippers of adjacent two pairs of grippers and on an upstream side of the movement path; and two adjacent pairs of grippers are moved in a same manner.

18. The bag transfer device according to claim 2, wherein the bag transfer device is a double bag transfer device in which an even number of pairs of grippers are provided;

two adjacent pairs of grippers have a common drive force transmission mechanism;

a first connecting link is provided to connect:
the arm support mechanism of the gripper, which is of one pair of grippers of adjacent two pairs of grippers and on a downstream side of the movement path, to
the arm support mechanism of the gripper, which is of another one pair of grippers of adjacent two pairs of grippers and on a downstream side of the movement path;

a second connecting link is provided to connect:
the arm support mechanism of the gripper, which is of one pair of grippers of adjacent two pairs of grippers and on an upstream side of the movement path, to
the arm support mechanism of the gripper, which is of another one pair of grippers of adjacent two pairs of grippers and on an upstream side of the movement path; and two adjacent pairs of grippers are moved in a same manner.

19. The bag transfer device according to claim 3, wherein the bag transfer device is a double bag transfer device in which an even number of pairs of grippers are provided;

two adjacent pairs of grippers have a common drive force transmission mechanism;

a first connecting link is provided to connect:
the arm support mechanism of the gripper, which is of one pair of grippers of adjacent two pairs of grippers and on a downstream side of the movement path, to the arm support mechanism of the gripper, which is of another one pair of grippers of adjacent two pairs of grippers and on a downstream side of the movement path;

a second connecting link is provided to connect:
the arm support mechanism of the gripper, which is of one pair of grippers of adjacent two pairs of grippers and on an upstream side of the movement path, to
the arm support mechanism of the gripper, which is of another one pair of grippers of adjacent two pairs of grippers and on an upstream side of the movement path; and two adjacent pairs of grippers are moved in a same manner.

20. The bag transfer device according to claim 4, wherein the bag transfer device is a double bag transfer device in which an even number of pairs of grippers are provided;
two adjacent pairs of grippers have a common drive force transmission mechanism;
a first connecting link is provided to connect:
the arm support mechanism of the gripper, which is of one pair of grippers of adjacent two pairs of grippers and on a downstream side of the movement path, to
the arm support mechanism of the gripper, which is of another one pair of grippers of adjacent two pairs of grippers and on a downstream side of the movement path;

a second connecting link is provided to connect:
the arm support mechanism of the gripper, which is of one pair of grippers of adjacent two pairs of grippers and on an upstream side of the movement path, to
the arm support mechanism of the gripper, which is of another one pair of grippers of adjacent two pairs of grippers and on an upstream side of the movement path; and two adjacent pairs of grippers are moved in a same manner.

* * * * *